(12) United States Patent  (10) Patent No.: US 7,725,560 B2
Bales et al.  (45) Date of Patent: *May 25, 2010

(54) WEB SERVICE-ENABLED PORTLET WIZARD

(75) Inventors: Christopher E. Bales, Boulder, CO (US); Scott Musson, Arvada, CO (US); Jalpesh Patadia, Boulder, CO (US); Troy Beecroft, Broomfield, CO (US)

(73) Assignee: BEA Systems Inc., Redwood Shores, CA (US)

( * ) Notice: Subject to any disclaimer, the term of this patent is extended or adjusted under 35 U.S.C. 154(b) by 1827 days.

This patent is subject to a terminal disclaimer.

(21) Appl. No.: 10/377,917

(22) Filed: Feb. 28, 2003

(65) Prior Publication Data

US 2004/0068554 A1  Apr. 8, 2004

Related U.S. Application Data

(60) Provisional application No. 60/376,913, filed on May 1, 2002.

(51) Int. Cl.
*G06F 15/16* (2006.01)
*G06F 3/00* (2006.01)

(52) U.S. Cl. .................................. 709/217; 715/762

(58) Field of Classification Search ................ 709/203, 709/217, 219, 218; 715/234, 742, 760, 762, 715/763, 765

See application file for complete search history.

(56) References Cited

U.S. PATENT DOCUMENTS

| | | | |
|---|---|---|---|
| 5,173,939 A | 12/1992 | Abadi et al. ................... 380/25 |
| 5,237,614 A | 8/1993 | Weiss | |
| 5,347,653 A | 9/1994 | Flynn et al. | |
| 5,355,474 A | 10/1994 | Thuraisngham et al. | |
| 5,369,702 A | 11/1994 | Shanton ......................... 380/4 |
| 5,426,747 A | 6/1995 | Weinreb et al. | |
| 5,481,700 A | 1/1996 | Thuraisingham ............ 395/600 |
| 5,544,322 A | 8/1996 | Cheng et al. | |
| 5,557,747 A | 9/1996 | Rogers et al. | |
| 5,627,886 A | 5/1997 | Bowman ..................... 379/111 |
| 5,797,128 A | 8/1998 | Birnbaum ....................... 707/5 |
| 5,825,883 A | 10/1998 | Archibald et al. | |

(Continued)

FOREIGN PATENT DOCUMENTS

EP  1 256 889 A  11/2002

(Continued)

OTHER PUBLICATIONS

Hunter, Jason, "Java Servlet Programming", second edition, O'Reilly, Apr. 11, 2001.*

(Continued)

*Primary Examiner*—Yemane Mesfin
(74) *Attorney, Agent, or Firm*—Fliesler Meyer LLP

(57) ABSTRACT

A web service user interface can be automatically generated, thus simplifying development of web applications. Web service configuration data can be received and proxies to access the web service can be automatically generated. Communication code can also be automatically generated to facilitate communicate with said web service using the proxies. Display code can be automatically generated to display content provided by a web service. In one example, the web service user interface is a portlet.

17 Claims, 29 Drawing Sheets

U.S. PATENT DOCUMENTS

| | | | |
|---|---|---|---|
| 5,826,000 A | 10/1998 | Hamilton | |
| 5,826,268 A | 10/1998 | Schaefer et al. | 707/9 |
| 5,848,396 A | 12/1998 | Gerace | 705/10 |
| 5,867,667 A | 2/1999 | Butman et al. | |
| 5,872,928 A | 2/1999 | Lewis et al. | |
| 5,889,953 A | 3/1999 | Thebaut et al. | |
| 5,918,210 A | 6/1999 | Rosenthal et al. | |
| 5,950,195 A | 9/1999 | Stockwell et al. | |
| 5,966,535 A | 10/1999 | Benedikt et al. | 395/707 |
| 5,966,707 A | 10/1999 | Van Huben et al. | |
| 5,987,469 A | 11/1999 | Lewis et al. | |
| 5,987,611 A | 11/1999 | Freund | |
| 5,991,877 A | 11/1999 | Luckenbaugh | 713/200 |
| 6,005,571 A | 12/1999 | Pachauri | 345/339 |
| 6,006,194 A | 12/1999 | Merel | |
| 6,029,144 A | 2/2000 | Barrett et al. | |
| 6,029,182 A | 2/2000 | Nehab et al. | 707/523 |
| 6,055,515 A | 4/2000 | Consentino et al. | |
| 6,055,637 A | 4/2000 | Hudson et al. | |
| 6,058,392 A | 5/2000 | Sampson et al. | 707/6 |
| 6,073,242 A | 6/2000 | Hardy et al. | |
| 6,083,276 A | 7/2000 | Davidson et al. | 717/1 |
| 6,098,173 A | 8/2000 | Elgressy et al. | |
| 6,141,010 A | 10/2000 | Hoyle | 345/356 |
| 6,141,686 A | 10/2000 | Jackowski et al. | |
| 6,148,333 A | 11/2000 | Guedalia et al. | |
| 6,154,844 A | 11/2000 | Touboul et al. | |
| 6,157,924 A | 12/2000 | Austin | 707/10 |
| 6,158,010 A | 12/2000 | Moriconi et al. | |
| 6,167,407 A | 12/2000 | Nachenberg et al. | |
| 6,167,445 A | 12/2000 | Gai et al. | |
| 6,170,009 B1 | 1/2001 | Mandal et al. | |
| 6,182,226 B1 | 1/2001 | Reid et al. | 713/201 |
| 6,202,157 B1 | 3/2001 | Brownlie et al. | |
| 6,202,207 B1 | 3/2001 | Donohue | |
| 6,209,101 B1 | 3/2001 | Mitchem et al. | |
| 6,216,231 B1 | 4/2001 | Stubblebine | |
| 6,226,745 B1 | 5/2001 | Wiederhold | 713/200 |
| 6,233,682 B1 | 5/2001 | Fritsch | 713/168 |
| 6,241,608 B1 | 6/2001 | Torango | 463/27 |
| 6,243,747 B1 | 6/2001 | Lewis et al. | |
| 6,253,321 B1 | 6/2001 | Nikander et al. | |
| 6,260,021 B1 | 7/2001 | Wong et al. | 705/2 |
| 6,260,050 B1 | 7/2001 | Yost et al. | 707/501 |
| 6,269,393 B1 | 7/2001 | Yost et al. | 709/201 |
| 6,269,456 B1 | 7/2001 | Hodges et al. | |
| 6,275,941 B1 | 8/2001 | Saito et al. | |
| 6,285,366 B1 | 9/2001 | Ng et al. | |
| 6,285,985 B1 | 9/2001 | Horstmann | 705/14 |
| 6,295,607 B1 | 9/2001 | Johnson | |
| 6,301,613 B1 | 10/2001 | Ahlstrom et al. | |
| 6,308,163 B1 | 10/2001 | Du et al. | 705/8 |
| 6,317,868 B1 | 11/2001 | Grimm et al. | |
| 6,327,594 B1 | 12/2001 | Van Huben et al. | |
| 6,327,618 B1 | 12/2001 | Ahlstrom et al. | |
| 6,327,628 B1 | 12/2001 | Anuff et al. | 709/311 |
| 6,332,134 B1 | 12/2001 | Foster | 705/39 |
| 6,339,423 B1 | 1/2002 | Sampson et al. | |
| 6,339,826 B2 | 1/2002 | Hayes et al. | |
| 6,341,352 B1 | 1/2002 | Child et al. | |
| 6,353,886 B1 | 3/2002 | Howard et al. | |
| 6,360,363 B1 | 3/2002 | Moser et al. | |
| 6,377,973 B2 | 4/2002 | Gideon | |
| 6,378,075 B1 | 4/2002 | Goldstein et al. | 713/200 |
| 6,385,627 B1 | 5/2002 | Cragun | |
| 6,393,474 B1 | 5/2002 | Eichert et al. | |
| 6,397,222 B1 | 5/2002 | Zellweger | |
| 6,412,077 B1 | 6/2002 | Roden et al. | |
| 6,418,448 B1 | 7/2002 | Sarkar | |
| 6,430,556 B1 | 8/2002 | Goldberg et al. | |
| 6,457,007 B1 | 9/2002 | Kikuchi et al. | |
| 6,460,141 B1 | 10/2002 | Olden | 713/201 |
| 6,466,239 B2 | 10/2002 | Ishikawa | |
| 6,473,791 B1 | 10/2002 | Al-Ghosein et al. | |
| 6,476,828 B1 | 11/2002 | Burkett et al. | 345/760 |
| 6,484,177 B1 | 11/2002 | Van Huben et al. | |
| 6,487,594 B1 | 11/2002 | Bahlmann | |
| 6,530,024 B1 | 3/2003 | Proctor | |
| 6,539,375 B2 | 3/2003 | Kawasaki | 707/5 |
| 6,542,908 B1 | 4/2003 | Ims | 707/204 |
| 6,553,410 B2 | 4/2003 | Kikinis | 709/218 |
| 6,571,247 B1 | 5/2003 | Danno et al. | 707/100 |
| 6,574,736 B1 | 6/2003 | Andrews | |
| 6,581,054 B1 | 6/2003 | Bogrett | |
| 6,581,071 B1 | 6/2003 | Gustman et al. | |
| 6,584,454 B1 | 6/2003 | Hummel, Jr. et al. | |
| 6,587,849 B1 | 7/2003 | Mason et al. | 707/5 |
| 6,587,876 B1 | 7/2003 | Mahon et al. | |
| 6,615,218 B2 | 9/2003 | Mandal et al. | |
| 6,618,806 B1 | 9/2003 | Brown et al. | |
| 6,654,747 B1 | 11/2003 | Van Huben et al. | |
| 6,665,677 B1 | 12/2003 | Wotring et al. | |
| 6,668,354 B1 | 12/2003 | Chen et al. | 715/517 |
| 6,684,369 B1 | 1/2004 | Bernardo et al. | |
| 6,721,888 B1 | 4/2004 | Liu et al. | |
| 6,735,586 B2 | 5/2004 | Timmons | 707/3 |
| 6,735,701 B1 | 5/2004 | Jacobson | |
| 6,738,789 B2 | 5/2004 | Multer et al. | |
| 6,751,659 B1 | 6/2004 | Fenger et al. | |
| 6,754,672 B1 | 6/2004 | McLauchlin | 707/104 |
| 6,769,095 B1 | 7/2004 | Brassard et al. | |
| 6,769,118 B2 | 7/2004 | Garrison et al. | |
| 6,779,002 B1 | 8/2004 | Mwaura | |
| 6,789,202 B1 | 9/2004 | Ko et al. | |
| 6,857,012 B2 | 2/2005 | Sim et al. | |
| 6,865,549 B1 | 3/2005 | Connor | |
| 6,880,005 B1 | 4/2005 | Bell et al. | |
| 6,889,222 B1 | 5/2005 | Zhao | |
| 6,904,454 B2 | 6/2005 | Stickler | |
| 6,934,934 B1 | 8/2005 | Osborne, II et al. | |
| 6,957,261 B2 | 10/2005 | Lortz | |
| 6,961,897 B1 | 11/2005 | Peel et al. | |
| 6,965,999 B2 | 11/2005 | Fox et al. | |
| 6,970,876 B2 | 11/2005 | Hotti et al. | |
| 6,978,379 B1 | 12/2005 | Goh et al. | |
| 7,003,578 B2 | 2/2006 | Kanada et al. | |
| 7,035,944 B2 | 4/2006 | Fletcher et al. | |
| 7,047,522 B1 | 5/2006 | Dixon et al. | |
| 7,062,490 B2 | 6/2006 | Adya et al. | |
| 7,080,000 B1 | 7/2006 | Cambridge | |
| 7,089,584 B1 | 8/2006 | Sharma | |
| 7,093,261 B1 | 8/2006 | Harper et al. | |
| 7,093,283 B1 | 8/2006 | Chen et al. | |
| 7,124,413 B1 | 10/2006 | Klemm et al. | |
| 7,174,563 B1 | 2/2007 | Brownlie et al. | |
| 7,185,192 B1 | 2/2007 | Kahn | |
| 2001/0032128 A1 | 10/2001 | Kepecs | |
| 2001/0034771 A1 | 10/2001 | Hutsch et al. | |
| 2001/0044810 A1 | 11/2001 | Timmons | |
| 2001/0047485 A1 | 11/2001 | Brown et al. | |
| 2002/0029296 A1 | 3/2002 | Anuff et al. | |
| 2002/0059394 A1 | 5/2002 | Sanders | |
| 2002/0062451 A1 | 5/2002 | Scheidt et al. | |
| 2002/0069261 A1 | 6/2002 | Bellare et al. | |
| 2002/0087571 A1 | 7/2002 | Stapel et al. | |
| 2002/0103818 A1 | 8/2002 | Amberden | |
| 2002/0104071 A1 | 8/2002 | Charisius et al. | |
| 2002/0107913 A1 | 8/2002 | Rivera et al. | |
| 2002/0111998 A1 | 8/2002 | Kim | |
| 2002/0120685 A1 | 8/2002 | Srivastava et al. | |
| 2002/0124053 A1 | 9/2002 | Adams et al. | |
| 2002/0135617 A1 | 9/2002 | Samid | |
| 2002/0143819 A1 | 10/2002 | Han et al. | |
| 2002/0147645 A1 | 10/2002 | Alao et al. | |

| | | | |
|---|---|---|---|
| 2002/0147696 | A1 | 10/2002 | Acker et al. |
| 2002/0152267 | A1 | 10/2002 | Lennon |
| 2002/0152279 | A1 | 10/2002 | Sollenberger et al. |
| 2002/0173971 | A1 | 11/2002 | Stirpe et al. |
| 2002/0188869 | A1 | 12/2002 | Patrick |
| 2003/0014442 | A1 | 1/2003 | Shiigi et al. |
| 2003/0032409 | A1 | 2/2003 | Hutcheson et al. |
| 2003/0046576 | A1 | 3/2003 | High et al. |
| 2003/0065721 | A1 | 4/2003 | Roskind |
| 2003/0088617 | A1 | 5/2003 | Clark et al. |
| 2003/0110448 | A1 | 6/2003 | Haut et al. |
| 2003/0131113 | A1 | 7/2003 | Reeves et al. |
| 2003/0135490 | A1 | 7/2003 | Barrett et al. |
| 2003/0167315 | A1* | 9/2003 | Chowdhry et al. .......... 709/218 |
| 2003/0167455 | A1 | 9/2003 | Iborra et al. |
| 2003/0187956 | A1 | 10/2003 | Belt et al. |
| 2003/0200350 | A1 | 10/2003 | Kumar et al. |
| 2003/0220913 | A1 | 11/2003 | Doganata et al. |
| 2003/0229623 | A1 | 12/2003 | Chang et al. |
| 2004/0024812 | A1 | 2/2004 | Park et al. |
| 2004/0205473 | A1 | 10/2004 | Fisher et al. |
| 2004/0205557 | A1 | 10/2004 | Bahrs et al. |
| 2005/0086206 | A1 | 4/2005 | Balasubramanian et al. |
| 2006/0059107 | A1 | 3/2006 | Elmore et al. |
| 2006/0122882 | A1 | 6/2006 | Brown et al. |

FOREIGN PATENT DOCUMENTS

| | | |
|---|---|---|
| WO | WO0038078 | 6/2000 |
| WO | WO0114962 A1 | 6/2000 |
| WO | WO0114962 A1 | 8/2000 |
| WO | WO0114962 | 3/2001 |
| WO | WO 01/67285 A | 9/2001 |

OTHER PUBLICATIONS

Sundsted, Todd, "JNDI Overview, Part 1: An Introduction to Naming Services"; JavaWorld; Jan. 2000, pp. 1-6; downloaded from: www/javaworld.com/javaworld/jw-01-howto_p.html).
Moore, Bill, et al.; "Migrating Weblogic Applications to WebSphere Advanced Edition"; IBM Redbooks, Jan. 2001; pp. 1.3-4, 109-111 and 181-195.
Barrett, Alexandra; "Trying Out Transactions"; SunExpert Magazine, Jan. 1999; pp. 57-59.
Ayers, Danny, et al.; Professional Java Server Programming, Wrox Press, Ltd., Birmingham, UK. Dec. 1999, pp. 515-545.
Ford, Nigle; Web Developer.com Guide to Building Intelligent Web Sites with JavaScript, Wiley Computer Publishing, New York, NY; © 1998, pp. 65-86, 101-102, 245-250 and 324-327.
Microsoft Computer Dictionary, 4th Edition, Microsoft Press, Redmond, WA © 1999, p. 489.
Eiji Okamoto, "Proposal for Intergrated Security Systems"; Jun. 1992, IEEE Computer Society Press; pp: 354-358.
"J2EE Enterprise Java Beans Technology"; http://java.sun.com/products/ejb; 2 pages (last visit: Dec. 7, 2004).
"To EJB, or not to EJB"; http://www.javaworld.com/javaworld/jw-12-2001/jw-1207-yesnoejb_p.html (last visit: Dec. 7, 2004.
"USDataCenter Chooses Baltimore SelectAccess to Enable Next generation Security Solutions for eBusiness"; Business Wire, P2079, Apr. 4, 2001; Newswire; Trade; pp. 2.
Gediminas Adomavicius, et al., "User Profiling in Personalization Applications Through Rule Discovery and Validation", KDD '99, San Diego CA © 1999 ACM, pp. 377-381.
Ibrahim Cingil, et al., "A Broader Approach to Personalization"; Communications of the ACM, vol. 43, No. 6, Aug. 2000; pp. 136-141.
Constantine Stephanidis, et al., "Decision Making in Intelligent User Interfaces", IUI '97, Orlando, FL, © 1997 ACM, pp. 195-202.
Oliver Stiemerling, et al., "How to Make Software Softer—Designing Tailorable Applications", DIS '97, Amsterdam, The Netherlands, © ACM 1997, pp. 365-376.
Eric Freudenthal, et al., "dRBAC: Distributed Role-based Access Control for Dynamic Coalition Environments", Proceedings of the 22nd International Conference on Distributed Computing Systems (ICDCS '02), IEEE 2002, 10 pages.
Zheng Zhang, et al., "Designing a Robust Namespace for Distributed File Services", Reliable Distributed System, 2001. Proceedings, 20th IEEE Symposium on Oct. 28-31, 2001, pp. 162-171.
Atul Adya, et al., "FARSITE: Federated, Available and Reliable Storage for an Incompletely Trusted Environment", ACM SIGOPS Operating Systems Review, vol. 36, Issue SI (Winter 2002). OSDI '02: Proceedings of the 5th Symposium on Operating Systems Design and Implementation, pp. 1-14.
Thomas Kistler, et al., "WebL—A Programming Language for the Web"; Computer Networks and ISDN Systems, Published by Elsevier Science B.V.; North Holland Publishing, Amsterdam, NL; vol. 30, No. 1-7; Apr. 1998; pp. 259-270.
Michael R. Levy, "Web Programming in Guide"; Software Practice & Experience, Wiley and Sons; Bognor Regis, GB; vol. 28; No. 15; Dec. 25, 1998; pp. 1581-1603.
David L. Atkins, et al., "Mawl: A Domain-specific Language for Form-based Services"; IEEE Transactions on Software Engineering; IEEE Service Center, Los Almitos, CA, US; vol. 25, No. 3; May 1999; pp. 334-346.
T. Howes, "The String Representation of LDAP Search Filters"; Dec. 1997 (RFC 2254); © The Internet Society (1997); pp. 1-8.
Supplementary European Search Report; Application No. 01975484.5; dated Dec. 12, 2006; Received Jan. 10, 2007; 2 pages.
Shirley Browne, et al., "Location-Independent Naming for Virtual Distributed Software Repositories"; http://portal.acm.org/dl.cfm, ACM Symposium on Software Reusability, Seattle, WA,US, Aug. 1995, © 1995 AMC; vol. 20, Issue SI, pp. 179-185.
Christina Catley, et al., "Design of a Health Care Architecture for Medical Data Interoperability and Application Integration"; Proceedings of the Second Joint EMBS/BMES Conference, Houston, TX, USA; Oct. 23-26, 2002; IEEE, vol. 3, pp. 1952-1953.
Hunter, et al., "Java Servlet Programming", Apr. 2001, 19 pages, Second Edition, O'Reilly & Associates, Sebastopol CA.
Parker, "The Complete Idiots Guide to Microsoft FrontPage 2000", 1999, pp. 7 and 55, QUE.
Rossi, et al., "Designing Personalized Web Applications", May 1-5, 2001, pp. 275-284, WWW 10, Hong Kong, ACM.
Candan, K.S., et al., "Enabling Dynamic Content Caching for Database-Driven Web Sites", Proceedings of the 2001 ACM SIGMOD International Conference on Management of Data, Santa Barbara, California, USA, May 21-24, 2001, pp. 532-543.
Tanyi, "Easy XML", Mar. 6, 2000, pp. 1-6, www.winsite.com.
Lee, et al., "Keeping Virtual Information Resources Up and Running", Nov. 1997, pp. 1-14, IBM Press.
"BEA WebLogic Integration™, Designing BEA WebLogic Integration Solutions," Version 2.1, Oct. 2001, BEA Systems, Inc., pp. i-xii, 1-1 through 3-34, and I-1 through I-4.
"BEA WebLogic Integration™, Designing BEA WebLogic Integration Solutions," Release 2.1, Service Pack 1, Jan. 2002, BEA Systems, Inc., pp. i-xii, 1-1 through 3-34, and I-1 through I-4.
"BEA WebLogic Integration™, Learning to Use BEA WebLogic Integration," Version 2.1, Oct. 2001, BEA Systems, Inc., i-x, 1-1 through 3-86, and A-1 through A-6.
"BEA WebLogic Integration™, Learning to Use BEA WebLogic Integration," Release 2.1, Service Pack 1, Jan. 2002, BEA Systems, Inc., i-xii, 1-1 through 3-86, and A1-A6.
"BEA WebLogic Integration™, Using EDI with WebLogic Integration," Version 2.1, Oct. 2001, revised Nov. 2, 2001, BEA Systems, Inc., pp. i-xii, and 1-1 through 7-8.
"BEA WebLogic Integration™, Using EDI with WebLogic Integration," Release 2.1, Service Pack 1, Jan. 2002, BEA Systems, Inc., pp. i-xii, and 1-1 through 7-8.
"Using the Web Service Portlet Wizard," BEA Systems, Inc., 2001, pp. 1-16.
"Using the Web Service Portlet Wizard With WebLogic Portal™ 4.0," BEA Systems, Inc., 2001, pp. 1-15.
"Java™2 Platform, Enterprise Edition—Overview, Application Model," java.sun.com/j2ee/overview2, pp. 1-3, printed on Apr. 30, 2002.
"Java™2 Platform, Enterprise Edition—Overview, Setting the Standard," java.sun.com/j2ee/overview2, pp. 1-3, printed on Apr. 30, 2002.

"Java™2 Platform, Enterprise Edition—Overview, Introduction," java.sun.com/j2ee/overview2, pp. 1-3, printed on Oct. 9, 2003.

"Explore the Dynamic Proxy API," JavaWorld, Nov. 2000, pp. 1-14.

Hayton, et al. "Access Control in an Open Distributed Environment", 12 pages, 1998.

Bertino et al., "TRBAC: A Temporal Role-Based Access Control Model", ACM Transactions on Information and System Security, Aug. 2001, pp. 191-223, vol. 4, No. 3.

Sandhu, et al., "Role-Based Access Control Models", IEEE Computer, Feb. 1996, pp. 38-47, vol. 29, No. 2.

Covington, et al., "Securing Context-Aware Applications Using Environment Roles", ACM workshop on Role Based Access Control, Proceedings of the Sixth ACM Symposium on Access Control Models and Technologies, 11 pages, 2001.

Yao, et al., "A Model of OASIS Role-Based Access Control and its Support for Active Security", ACM workshop on Role Based Access Control, Proceedings of the Sixth ACM Symposium on Access Control Models and Technologies, 11 pages, 2001.

Georgiadis, et al., "Flexible Team-Based Access Control Using Contexts", ACM workshop on Role Based Access Control, Proceedings of the Sixth ACM Symposium on Access Control Models and Technologies, 7 pages, 2001.

Tzelepi, et al., "A Flexible Content and Context-Based Access Control Model for Multimedia Medical Image Database Systems", International Multimedia Conference, Proceedings of the 2001 workshop on Multimedia and security: new challenges, 4 pages, 2001.

Goh, "Towards a More Complete Model of Role", Symposium on Access Control Models and Technologies, Proceedings of the third ACM workshop on Role-Based Access Control, 7 pages, 1998.

C.W. Symborski, "Updating Software and Configuration Data in a Distributed Communications Network"; Computer Networking Symposium, 1988; pp. 331-338.

IBM, "Method and System for Visually Constructing Document Type Definitions and Related Artifacts Using a Reusable Object Model", Technical Disclosure, May 23, 2001, 3 pages, IP.com.

\* cited by examiner

```
<%@ include file="HelloWorld_include.inc" %>
<%@ taglib uri="portlet.tld" prefix="portlet" %>
<%@ taglib uri="i18n.tld" prefix="i18n" %>
<%@ page import="com.bea.portal.appflow.PortalAppflowConstants"%>
<%@ include file="/framework/resourceURL.inc"%>

<%
   http___workshop_7001_samples_HelloWorld_jws_WSDL_wsdl.HelloWorld
p_http___workshop_7001_samples_HelloWorld_jws_WSDL_wsdl_HelloWorld =
new
http___workshop_7001_samples_HelloWorld_jws_WSDL_wsdl.HelloWorld();

http___workshop_7001_samples_HelloWorld_jws_WSDL_wsdl.HelloWorldSoap
p_http___workshop_7001_samples_HelloWorld_jws_WSDL_wsdl_HelloWorldSo
ap =
p_http___workshop_7001_samples_HelloWorld_jws_WSDL_wsdl_HelloWorld.g
etHelloWorldSoap();
%>

<%
   String target = request.getParameter("target");

String req_name = request.getParameter("name");
   if ( req_name == null ) req_name = "";
%>
<portlet:form event="<%= PortalAppflowConstants.PORTLET_REFRESH %>">
   <table border="0" align="center">
      <TR>
         <TD width="100%" align="center">
         <table border="0" align="left">
         <TR>
            <td align="right"><b><i18n:getMessage
messageName='service.documentation'
bundleName='<%=getBundleName((javax.servlet.jsp.JspPage)pageContext.getP
age())%>'/></b></td><td></td>
         </TR>
         <TR>
            <td align="right"><b><i18n:getMessage
messageName='operation.name'
bundleName='<%=getBundleName((javax.servlet.jsp.JspPage)pageContext.getP
age())%>'/></b></td><td>HelloWorld.hello
</td>
```

Figure 8A

```
</TR>
<TR>
    <td align="right"><b><i18n:getMessage
messageName='operation.documentation'
bundleName='<%=getBundleName((javax.servlet.jsp.JspPage)pageContext.getP
age())%>'/></b></td><td></td>
</TR>
<TR>
<%
        if ( target != null
            && target.equals("target_submit_hello")
            && req_name.trim().length() > 0 )
        {
          try
          {
%>
            <tr><td
align="right"><b><%=cnvrtSC("name")%></b></td><td><%=cnvrtSC(String.valu
eOf(req_name))%></td></tr>

<td align="right"><b><i18n:getMessage
messageName='result'
bundleName='<%=getBundleName((javax.servlet.jsp.JspPage)pageContext.getP
age())%>'/></b></td><td><%=cnvrtSC(String.valueOf(p_http___workshop_7001
_samples_HelloWorld_jws_WSDL_wsdl_HelloWorldSoap.hello((new
String(req_name)).toString())))%></td>
<%
          }
          catch ( Exception ignore )
          {
%>
            <i18n:getMessage messageName='functionality.unavailable'
bundleName='<%=getBundleName((javax.servlet.jsp.JspPage)pageContext.getP
age())%>'/><%=cnvrtSC(ignore.toString())%><br>
<%
          }
        }
%>
```

Figure 8B

```html
        </TR>
      </table>
    </TD>
  </TR>
  <tr>
    <td width="100%" align="center"><b>name</b></td>
  </tr>
  <tr>
    <td width="100%" align="center"><input type="text" name="name" size="20" maxlength="50" value="<%=req_name%>"></td>
  </tr>

<tr>
    <td width="100%" align="center"><input type="submit" name="submit_hello" value="Submit"></td>
  </tr>

</table>
<br><br>
<input type="hidden" name="target" value="target_submit_hello">
</portlet:form>
```

Figure 8C

```
<%@ include file="HelloWorld_include.inc" %>
<%@ taglib uri="portlet.tld" prefix="portlet" %>
<%@ taglib uri="i18n.tld" prefix="i18n" %>
<%@ page import="com.bea.portal.appflow.PortalAppflowConstants"%>
<%@ include file="/framework/resourceURL.inc"%>

<%
    http___workshop_7001_samples_HelloWorld_jws_WSDL_wsdl.HelloWorld
p_http___workshop_7001_samples_HelloWorld_jws_WSDL_wsdl_HelloWorld =
new
http___workshop_7001_samples_HelloWorld_jws_WSDL_wsdl.HelloWorld();
    http___workshop_7001_samples_HelloWorld_jws_WSDL_wsdl.HelloWorldSoap
p_http___workshop_7001_samples_HelloWorld_jws_WSDL_wsdl_HelloWorldSoap
=
p_http___workshop_7001_samples_HelloWorld_jws_WSDL_wsdl_HelloWorld.get
HelloWorldSoap();
%>

<%
    java.lang.String name = __REPLACE_ME__;
%>
<%=cnvrtSC(String.valueOf(p_http___workshop_7001_samples_HelloWorld_jws_
WSDL_wsdl_HelloWorldSoap.hello(name)))%>
```

Figure 9

```
<%@ include file="HelloWorld_include.inc" %>
<%@ taglib uri="portlet.tld" prefix="portlet" %>
<%@ taglib uri="i18n.tld" prefix="i18n" %>
<%@ page import="com.bea.portal.appflow.PortalAppflowConstants"%>
<%@ include file="/framework/resourceURL.inc"%>

<%
    http___workshop_7001_samples_HelloWorld_jws_WSDL_wsdl.HelloWorld
p_http___workshop_7001_samples_HelloWorld_jws_WSDL_wsdl_HelloWorld =
new
http___workshop_7001_samples_HelloWorld_jws_WSDL_wsdl.HelloWorld();

http___workshop_7001_samples_HelloWorld_jws_WSDL_wsdl.HelloWorldSoap
p_http___workshop_7001_samples_HelloWorld_jws_WSDL_wsdl_HelloWorldSo
ap =
p_http___workshop_7001_samples_HelloWorld_jws_WSDL_wsdl_HelloWorld.g
etHelloWorldSoap();
%>

<%/*
public abstract java.lang.String
http___workshop_7001_samples_HelloWorld_jws_WSDL_wsdl.HelloWorldSoap.
hello(java.lang.String)
throws java.rmi.RemoteException
public abstract org.openuri.www.HelloResponse
http___workshop_7001_samples_HelloWorld_jws_WSDL_wsdl.HelloWorldSoap.
hello(org.openuri.www.Hello)
throws java.rmi.RemoteException
*/%>
```

Figure 10

```xml
<?xml version="1.0" encoding="UTF-8"?>
<portal xmlns="http://www.bea.com/servers/portal/xsd/portal/1.1.0"
    xmlns:xsi="http://www.w3.org/2001/XMLSchema-instance"
  xsi:schemaLocation="http://www.bea.com/servers/portal/xsd/portal/1.1.0 portal-1_1_0.xsd">
    <is-complete>true</is-complete>
    <content-url>/framework/page.jsp</content-url>
    <header-url>/framework/header.jsp</header-url>
    <footer-url>/framework/footer.jsp</footer-url>
    <suspended-url>suspended.jsp</suspended-url>
    <suspended>false</suspended>
    <nav-bar-vertical-url>/framework/vnav_bar.jsp</nav-bar-vertical-url>
    <nav-bar-horizontal-url>/framework/hnav_bar.jsp</nav-bar-horizontal-url>
    <description>A really great portal built on BEA.</description>
    <webflow-filename>portal</webflow-filename>
    <start-page-url/>
    <pages> home
          <default-image-name>home.gif</default-image-name>
          <selected-image-name>v_home.gif</selected-image-name>
          <rollover-image-name>home.gif</rollover-image-name>
          <layout-pool>
             <layout-name>fourcolumn</layout-name>
             <layout-name>threecolumn</layout-name>
             <layout-name>spanning</layout-name>
          </layout-pool>
          <portlet-pool>
             <portlet-name>Portfolio</portlet-name>
             <portlet-name>Email</portlet-name>
             <portlet-name>PrimaryCampaign</portlet-name>
             <portlet-name>SecondaryCampaign</portlet-name>
             <portlet-name>QuickLinks</portlet-name>
             <portlet-name>CompanyProfiles</portlet-name>
             <portlet-name>GroupToDo</portlet-name>
             <portlet-name>MyToDo</portlet-name>
             <portlet-name>WhatsHot</portlet-name>
             <portlet-name>CustomerService</portlet-name>
             <portlet-name>Newsletters</portlet-name>
             <portlet-name>MyNewsletters</portlet-name>
             <portlet-name>ReviewNewsletters</portlet-name>
          </portlet-pool> web
          <default-image-name>web.gif</default-image-name>
          <selected-image-name>v_web.gif</selected-image-name>
          <rollover-image-name>web.gif</rollover-image-name>
          <layout-pool>
             <layout-name>twocolumn</layout-name>
             <layout-name>spanningthreecolumn</layout-name>
          </layout-pool>
```

Figure 14A

```xml
            <portlet-pool>
                <portlet-name>WorldNews</portlet-name>
                <portlet-name>Bookmarks</portlet-name>
                <portlet-name>Dictionary</portlet-name>
                <portlet-name>Quote</portlet-name>
                <portlet-name>WebSearch</portlet-name>
            </portlet-pool>

</pages>
    <property-set-pool>
        <property-set-name>Avitek.usr</property-set-name>
        <property-set-name>Investor.usr</property-set-name>
    </property-set-pool>
    <skin-pool>
        <skin-name>blueinfinity</skin-name>
        <skin-name>brightlight</skin-name>
        <skin-name>coologic</skin-name>
        <skin-name>futurism</skin-name>
        <skin-name>lumiereorange</skin-name>
    </skin-pool>
    <layout-pool>
        <layout-name>twocolumn</layout-name>
        <layout-name>threecolumn</layout-name>
        <layout-name>fourcolumn</layout-name>
        <layout-name>spanning</layout-name>
        <layout-name>spanningthreecolumn</layout-name>
    </layout-pool>
    <portlet-pool>
        <portlet-name>WorldNews</portlet-name>
        <portlet-name>Portfolio</portlet-name>
        <portlet-name>Bookmarks</portlet-name>
        <portlet-name>Dictionary</portlet-name>
        <portlet-name>Email</portlet-name>
        <portlet-name>Quote</portlet-name>
        <portlet-name>WebSearch</portlet-name>
        <portlet-name>PrimaryCampaign</portlet-name>
        <portlet-name>SecondaryCampaign</portlet-name>
        <portlet-name>QuickLinks</portlet-name>
        <portlet-name>CompanyProfiles</portlet-name>
        <portlet-name>GroupToDo</portlet-name>
        <portlet-name>MyToDo</portlet-name>
        <portlet-name>CustomerService</portlet-name>
        <portlet-name>Newsletters</portlet-name>
        <portlet-name>MyNewsletters</portlet-name>
        <portlet-name>ReviewNewsletters</portlet-name>
        <portlet-name>WhatsHot</portlet-name>
    </portlet-pool>
</portal>
```

Figure 14B

```xml
<?xml version="1.0" encoding="UTF-8"?>
<portlet xmlns="http://www.bea.com/servers/portal/xsd/portlet/1.0.1"
    xmlns:xsi="http://www.w3.org/2001/XMLSchema-instance"
  xsi:schemaLocation="http://www.bea.com/servers/portal/xsd/portlet/1.0.1 portlet-1_0_1.xsd">
    <portlet-name>WorldNews</portlet-name>
    <is-complete>true</is-complete>
    <description>A World News portlet</description>
    <webflow-filename>worldnews</webflow-filename>
    <content-url>/portlets/worldnews/moreovernews.jsp</content-url>
    <header-url/>
    <alternate-header-url/>
    <footer-url/>
    <alternate-footer-url/>
    <titlebar-url>/framework/titlebar.jsp</titlebar-url>
    <banner-url/>
    <editable>true</editable>
    <edit-url>/portlets/worldnews/moreovernewsedit.jsp</edit-url>
    <helpable>false</helpable>
    <help-url/>
    <icon-url>/portlets/worldnews/images/world_news.gif</icon-url>
    <minimizable>true</minimizable>
    <maximizable>true</maximizable>
    <maximize-url/>
    <mandatory>false</mandatory>
    <movable>true</movable>
    <floatable>false</floatable>
    <default-minimized>false</default-minimized>
    <login-required>true</login-required>
</portlet>
```

Figure 15

WEB SERVICE-ENABLED PORTLET WIZARD

PRIORITY CLAIM

The present application claims the benefit of the filing date of U.S. Provisional Patent Application No. 60/376,913, filed May 1, 2002, incorporated by reference herein.

CROSS-REFERENCE TO RELATED APPLICATIONS

The following applications are cross-referenced and incorporated herein by reference:

U.S. patent application Ser. No. 10/377,865, entitled "PORTAL SETUP WIZARD," filed Feb. 28, 2003.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or but otherwise reserves all copyright rights whatsoever.

FIELD OF THE INVENTION

The present invention is directed to technology for interfacing with web services and automatically generating portlets and displays of web service content.

BACKGROUND

As understood by those skilled in the art, web services can be implemented as software components that provide content and/or functionality to remote web applications via the Internet. Remote applications can submit requests for information to web services and receive content in return. Similarly, applications can pass data to web services in the form of "operations" to be processed by web services, wherein a result is returned from the web service to the application. Web service content can be passed to a client of the application where it can be displayed, processed, or otherwise utilized. Such arrangements allow application developers to leverage the functionality provided by web services without requiring the duplication of the functionality to be provided locally in an application.

Unfortunately, the interfacing of web applications with web services can be a cumbersome process. Application developers may be unfamiliar with the particulars of web service protocols, conventions, and/or XML descriptors that can be used to communicate with web services. Developers may also be unfamiliar with how to create client-accessible web service content displays. If developers do not possess the expertise to accomplish these lower-level tasks, they can be forced to devote unreasonable time and effort away from their field of expertise, namely application development.

BRIEF SUMMARY

In view of the above, it is desirable to provide an automated way for developers to interface applications with web services. It is further desirable to provide an automated way to display web service content to clients. The present invention, roughly described, provides for automatic generation of a portlet user interface. In certain embodiments, generated code facilitates user interaction with web services. In other embodiments, a wizard-style interface facilitates the setup of portlets and web service displays.

BRIEF DESCRIPTION OF THE FIGURES

FIGS. 8A-8C illustrate sample portlet code generated in accordance with an embodiment of the present invention using form-based code generation.

FIG. 9 illustrates sample portlet code generated in accordance with an embodiment of the present invention using web service call-based code generation.

FIG. 10 illustrates sample portlet code generated in accordance with an embodiment of the present invention using web service interface-based code generation.

FIGS. 14A and 14B illustrate sample code for an XML portal definition generated in accordance with an embodiment of the present invention.

FIG. 15 illustrates sample code for an XML portlet definition generated in accordance with an embodiment of the present invention.

DETAILED DESCRIPTION

Figure 1:
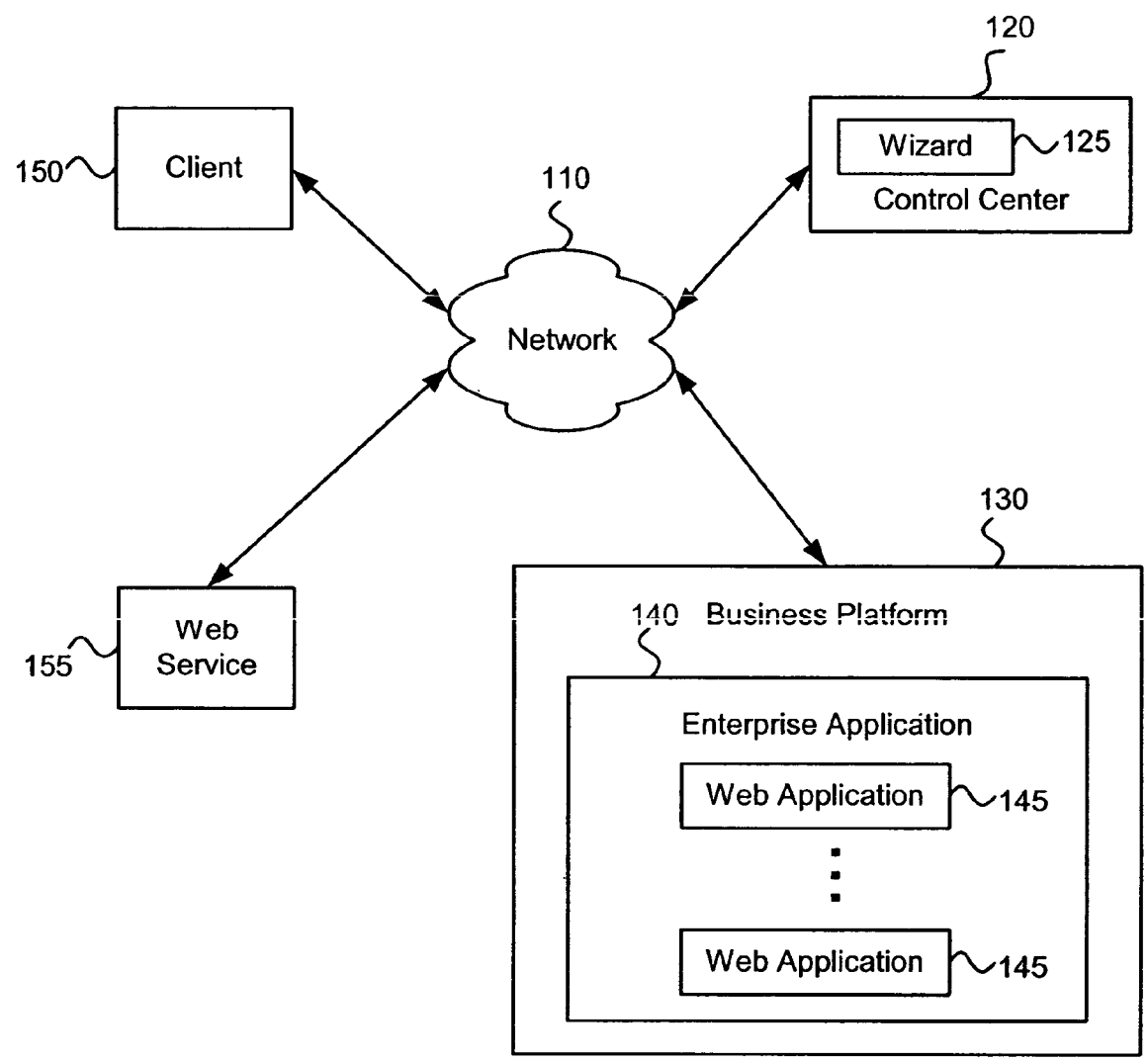
FIG. 1 is a high level block diagram of various software components of a computer network supporting a configurable electronic business system in accordance with an embodiment of the present invention.

FIG. 1 is a high level block diagram of various software components of a computer network supporting a configurable electronic business system in accordance with the present invention.

Business platform 130 is an electronic business platform, such as WEBLOGIC PLATFORM™ 7.0 available from BEA Systems, Inc. of San Jose, Calif. Business platform 130 is capable of hosting one or more enterprise applications 140 which provide services to client 150 over network 110. Enterprise application 140 can include one or more web applications 145. In one embodiment, business platform 130 is implemented on a web server which implements JAVA™ 2

Platform, Enterprise Edition (J2EE) version 1.3, available from Sun Microsystems, Inc. of Santa Clara, Calif.

Control center 120 is a software component capable of configuring business platform 130. Wizard interface component 125 is integrated into control center 120 and provides a wizard-style interface that facilitates the setup of web service 155 to be interfaced with application 135 and displayed to client 150. In various embodiments, wizard 125 facilitates the generation of portals and/or portlets and the integration of the same. In various embodiments, data can be synchronized between control center 120 and business platform 130. As a result, control center 120 can operate as a swing application, capable of configuring multiple business platforms, without requiring control center 120 to be in communication with the business platforms/servers during configuration.

Web service 155 is a web service as understood by those skilled in the art. Web service 155 can be implemented as a software component that can be invoked by one or more operations across the Internet. For example, web service 155 can receive a stock quote request from an enterprise application such as application 135 and return the requested information back to application 135. Thus, application 135 can utilize the functionality of web service 155 remotely over network 110 without having to duplicate the same services locally within application 135.

Enterprise applications can communicate with web services using one or more of an emerging group of standards that govern their description and interaction. The Simple Object Access Protocol (SOAP), which uses a combination of XXML-based data structuring and the Hyper Text Transfer Protocol (HTTP) to define a standardized method for invoking methods in objects that are distributed in diverse operating environments across the Internet. The Universal Description, Discovery, and Integration (UDDI) project provides a structure for XML-based online business registries where businesses register and advertise their web services. The project creates a platform-independent, open framework for describing services, discovering businesses, and integrating business services using the Internet. The Web Services Description Language (WSDL) is an XML language that is used to describe a web service and to specify how to communicate with the web service.

Figure 2:
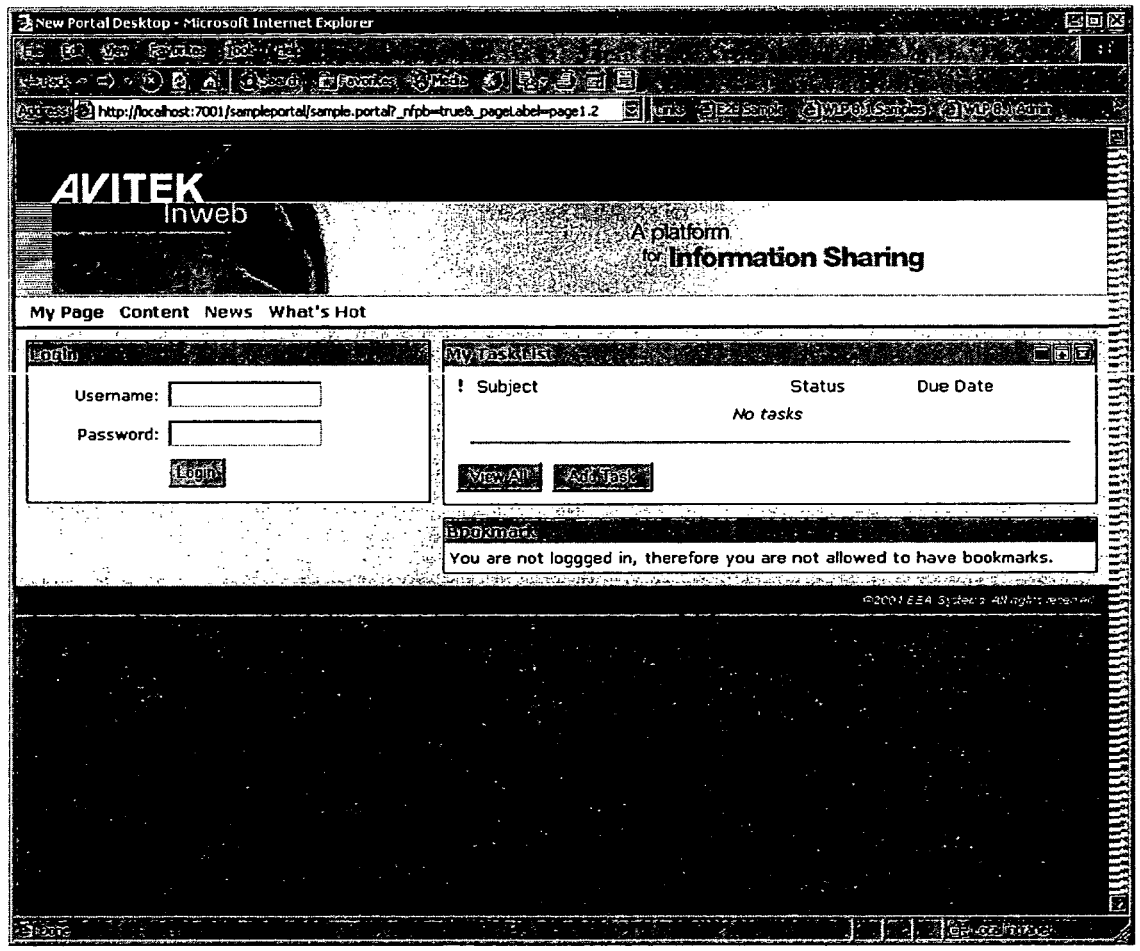
FIG. 2 illustrates a sample screen shot of an application displayed to a client in a portal-style presentation employing multiple portal pages and portlets.

Referring to FIG. 1, client 150 is a software component that requests services provided by application 135. Web service content and/or other content provided by application 135 can be displayed to client 150 in a portal-style display. Such a display can employ multiple portal pages and portlets. FIG. 2 illustrates a sample screen shot of an application displayed to a client in a portal-style presentation. Several portlets are included in the portal page of FIG. 2, including a LOGIN portlet, a MY TASK LIST portlet, and a BOOKMARK portlet.

Portals can provide access to information networks and/or sets of services through the World Wide Web or other computer networks. These networks can range from broad interconnections of computing systems such as the Internet to localized area networks including a few computers located in close geographic proximity such as a home or office. Portal applications can include web applications designed as a portal.

Portlets can be implemented as java server pages (JSP's) with XML-based metadata that fit into a portal. Portlets can utilize various types of display code to display highly focused information directed to a specific user or user group, having a portal as its container. Portlets are comprised of portlet components which include portlet attributes (i.e. whether the portlet is editable, floatable, minimizable, maximizable, helpable, mandatory, has defaults minimized, or whether login is required) and portlet layout elements or components (i.e. banner, header, content, and footer sections). In one embodiment, a portlet is defined by a file that contains a portlet's XML-based metadata, which is created and edited by control center 120. Portlets can also be associated with portlet resource files including stub JSPs (one for each portlet layout element) and image files created and saved to a local file system by wizard 125 of control center 120. In one embodiment, portlet resource files do not include the portlet definition itself or a file implementing webflow, as further described herein.

Figure 3A:
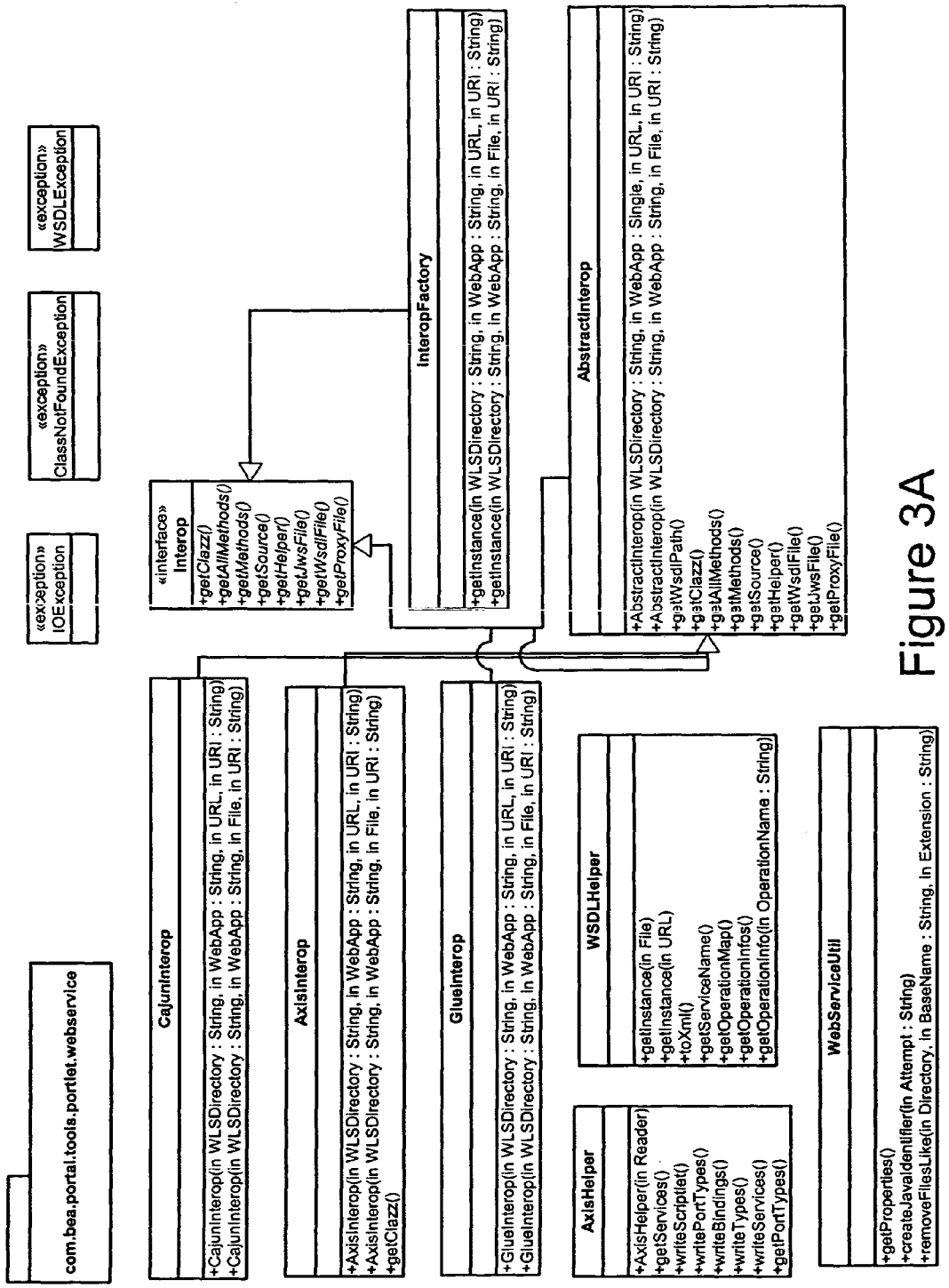
FIGS. 3A-3B illustrate a hierarchy of objects which can be used to implement a portlet wizard in accordance with an embodiment of the present invention.
Figure 3B:
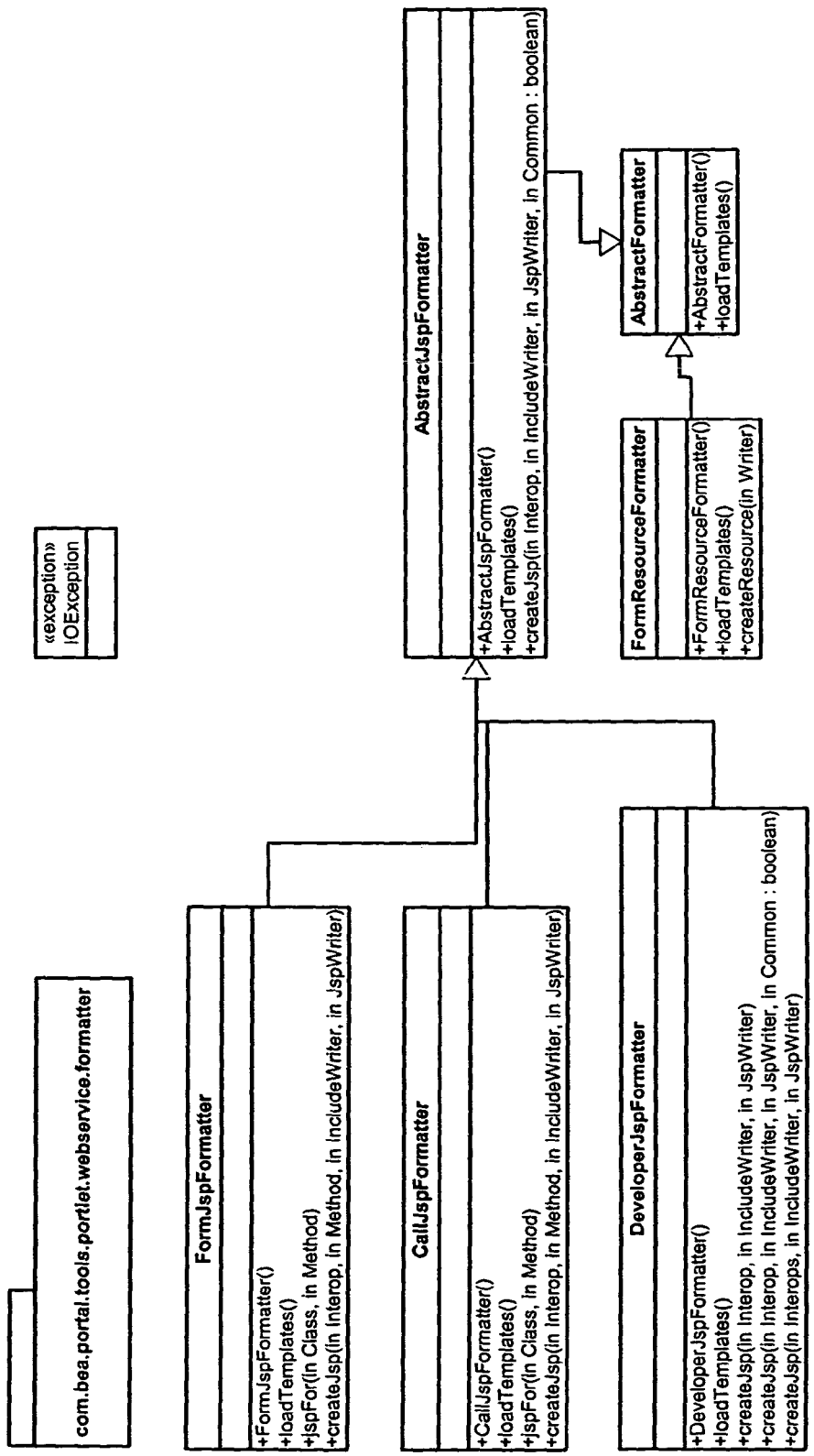

FIGS. 3A-3B illustrate a set of objects that can be used to implement a wizard 125 which can facilitate the setup of web services to be interfaced with applications and to automatically generate portlets in accordance with the present invention.

In accordance with one embodiment of the present invention, wizard 125 automates the creation of a portlet and reduces the number of steps otherwise needed for portlet creation. In the simplest case, a developer can create a new portlet without providing any input and simply accept default values. Wizard 125 includes the ability to create a portlet that consumes a web service 155. This allows developers to discover a web service and generate a portlet JSP implementation that can interact with the web service. In one embodiment, the generated code provides a default HTML form for entering input parameters, and a default HTML output of the results of the service invocation. In another embodiment, when project data from control center 120 is synchronized with business platform 130, the JSP files that constitute a portlet are synchronized as well. In another embodiment, the information entered into wizard 125 is stored as variables in a wizard framework that persist until the portlet created with wizard 125 is saved. Wizard 125 can be implemented using software compliant with J2EE.

In accordance with another embodiment of the present invention, wizard 125 automates the creation of a portal and reduces the number of steps otherwise needed for portal creation. Wizard 125 provides the ability to create a working portal resulting in a client-side file structure including all portal related J2EE and control center files required on the client-side. Wizard 125 can extract J2EE files including JSP's, html files, images, etc. from a user selected template and save them in a user selected location; modify various XML files as needed; and create and save the necessary portal, portlet, and webflow definition files into the control center "project" directory structure. Wizard 125 can be implemented using software compliant with J2EE.

Referring to FIG. 1, control center 120, business platform 130, web service 155, and client 150 can communicate over network 110. Moreover, communication between the components of FIG. 1 can be performed using any of the applicable data formats and/or protocols known in the art including, but not limited to: TCP/IP, XML, and/or SOAP. In the embodiment depicted in FIG. 1, software components 120, 130, 155, and 150 are illustrated as communicating over network 110. In alternate embodiments, some or all of the components can communicate with each other directly (not shown) rather than over network 110.

Portlet Generation

Figure 4A:
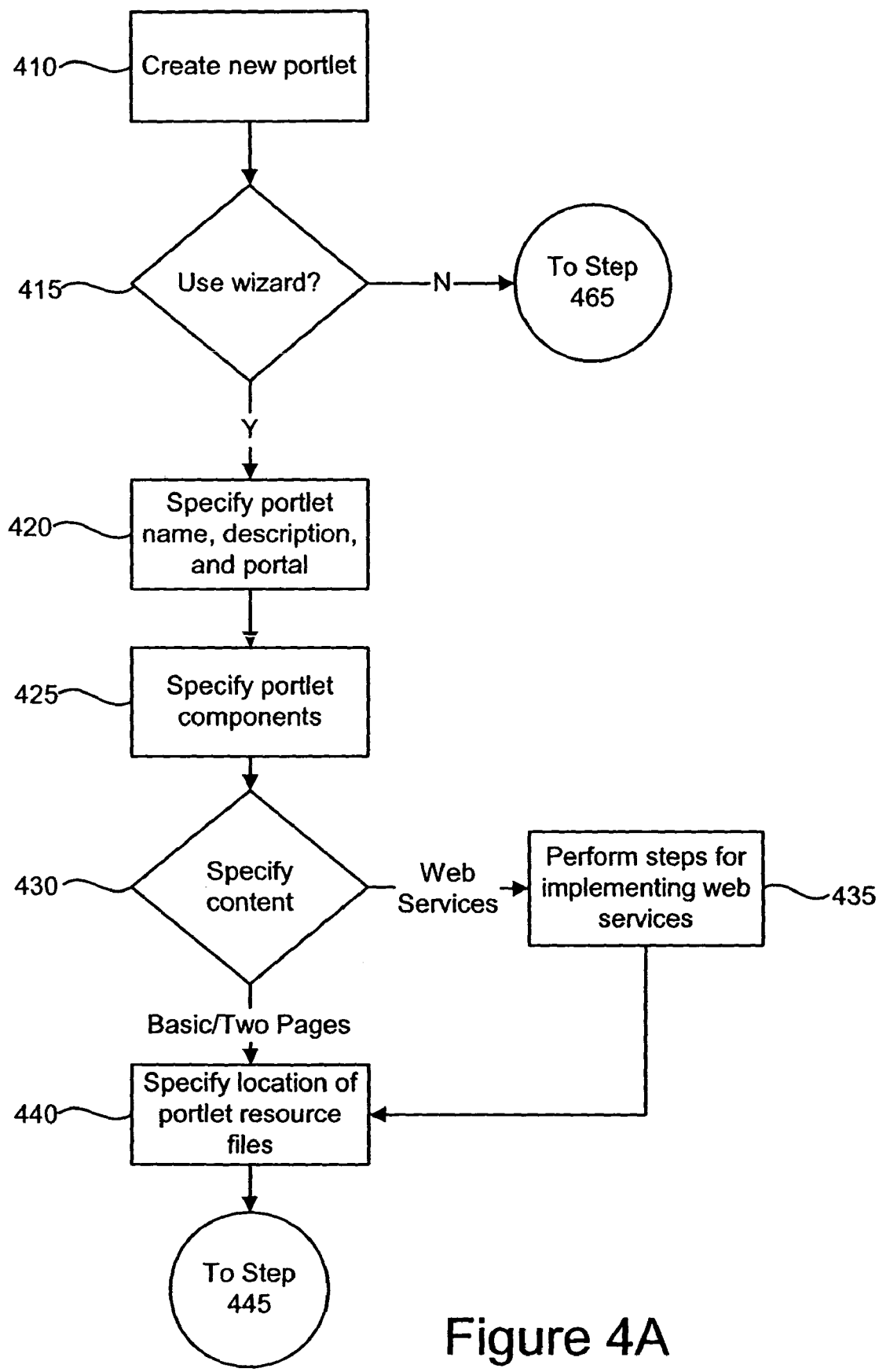
FIGS. 4A-4B illustrate a flowchart of a method for creating a portlet in accordance with an embodiment of the present invention.
Figure 4B:
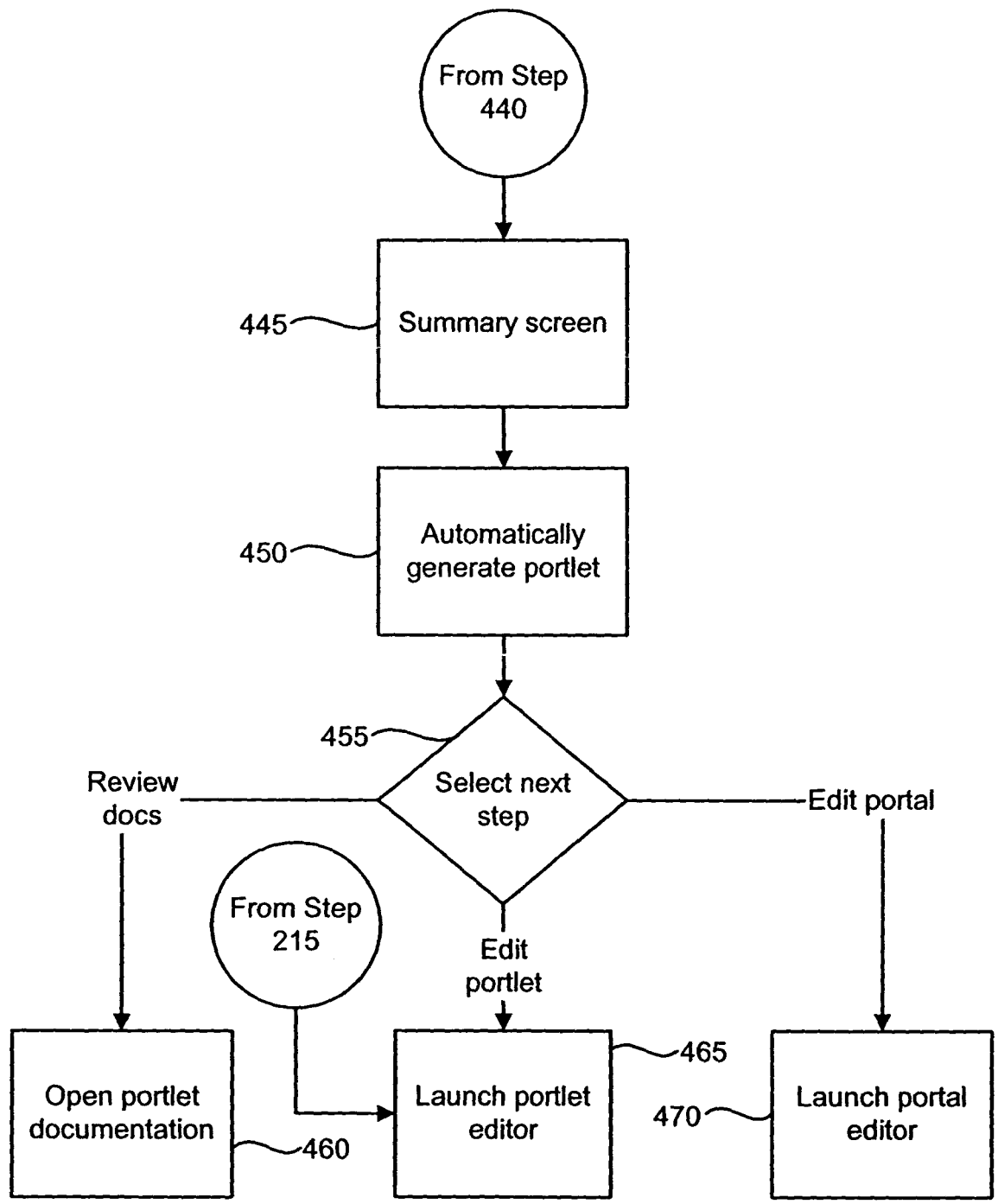
Figure 7A:
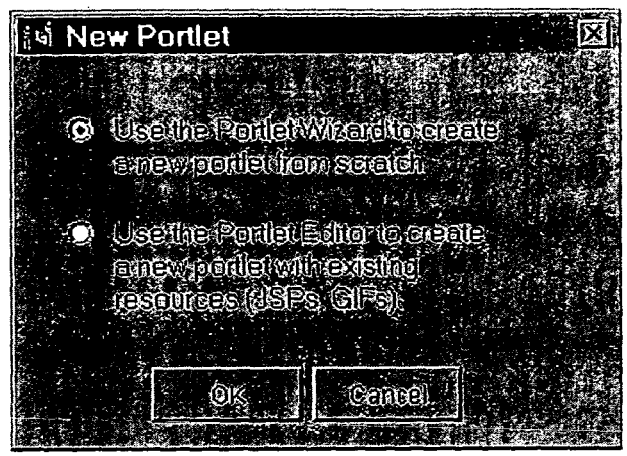
FIGS. 7A-7L illustrate sample screen shots of a user interface for creating a portlet in accordance with an embodiment of the present invention.

FIGS. 4A-4B illustrate a flowchart of a method for creating a portlet in accordance with the present invention. In step 410, a user (such as a business platform administrator) decides to create a new portlet. In step 415, a new portlet dialog screen allows the user to specify whether or not the portlet should be created using a wizard-style interface. If the wizard-style interface is not selected, then the method proceeds to step 465 where a dialog-based editor is opened for further interaction by the user. If the wizard-style interface is selected, then wizard 125 is launched and the method proceeds to step 420. FIG. 7A illustrates a sample screen shot of a new portlet dialog screen. In the sample screen shot of FIG. 7A, the wizard-style interface is selected by default.

Figure 7B:
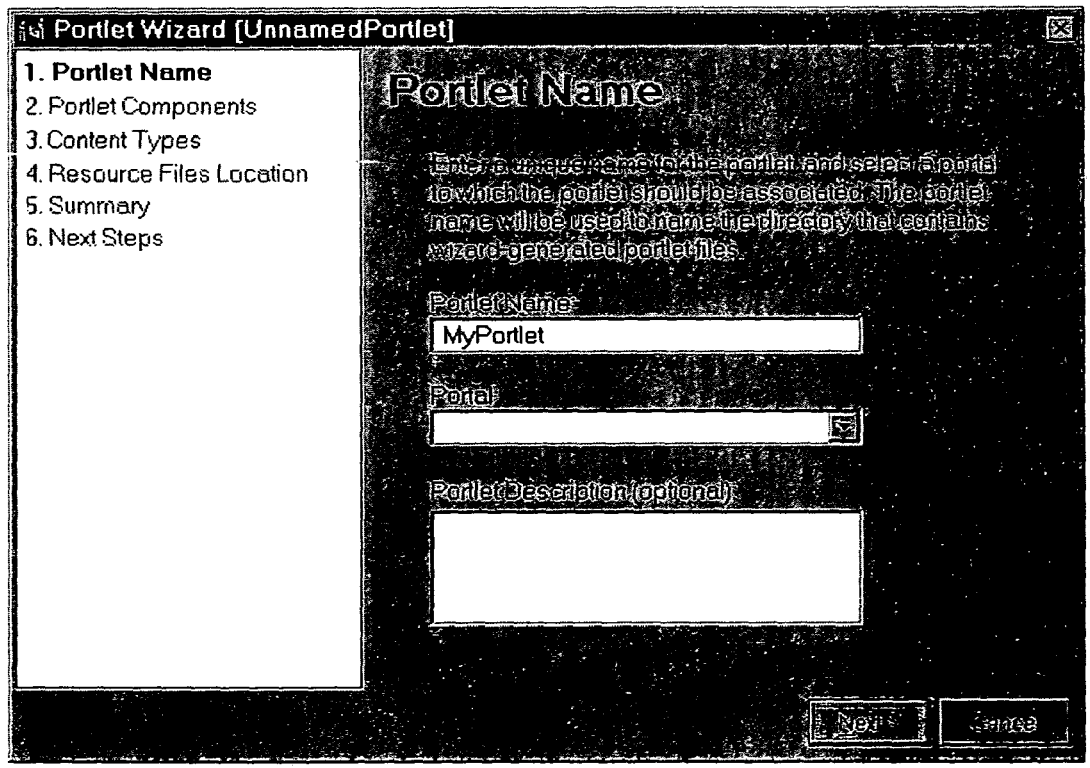

In step 420, wizard 125 displays a portlet name screen to the user. FIG. 7B illustrates a simple screen shot of a portlet name screen. The user can input the name and description of the portlet to be created by wizard 125. A drop-down menu is also provided, permitting the user to select the portal in which the portlet will be implemented. In one embodiment, the values displayed in the drop-down menu are obtained by performing a search for existing portal definitions. A default value can also be automatically provided for the user. In another embodiment, wizard 125 validates the selection of portals in the drop-down menu based on whether portals are currently open or are identified as read-only. After the portlet name screen is completed, the method proceeds to step 425. Alternatively, the user can be required to enter a unique and valid name in the portlet name text field and select a portal with which to associate the portlet before proceeding to step 425.

Figure 7C:
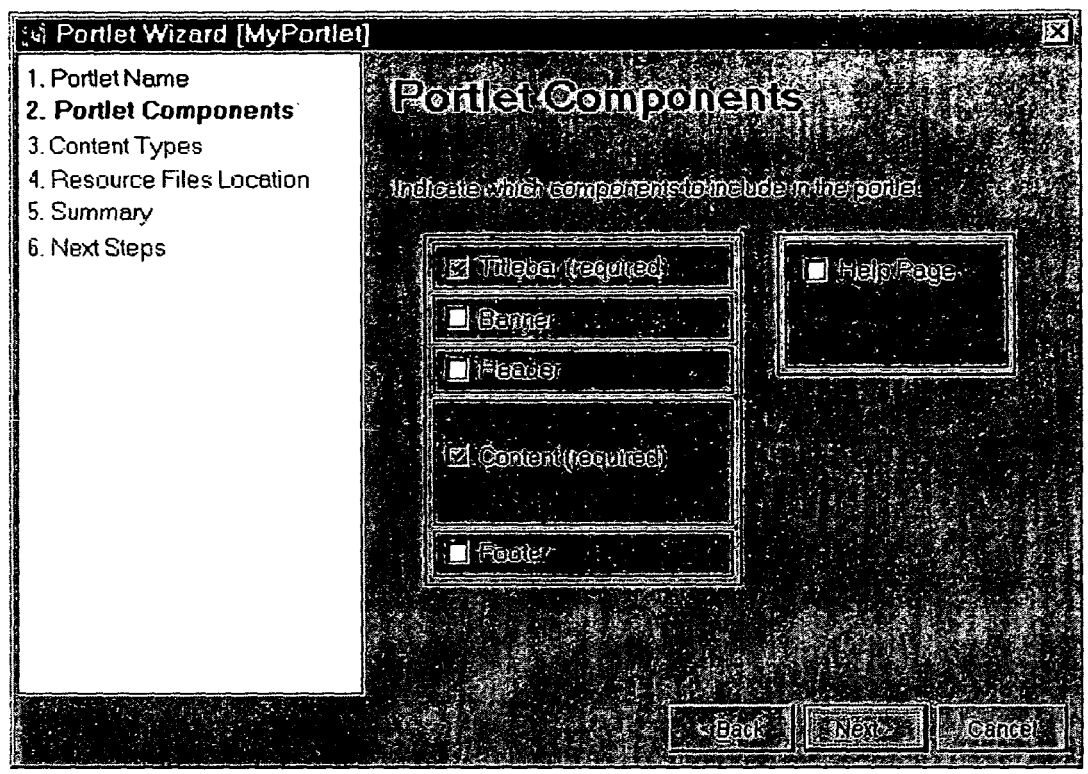

In step 425, wizard 125 displays a portlet components screen to the user, allowing the user to specify the components to be displayed in the new portlet. For example, in one embodiment, portlets can include a titlebar, banner, header, footer, help page, and content. FIG. 7C illustrates a sample screen shot of a portlet components screen. In the sample screen shot, the titlebar and content components have been automatically selected. In one embodiment, if header or footer components are selected, then alternate header or footer JSP files are created in addition to default header or footer JSP files.

Figure 7D:
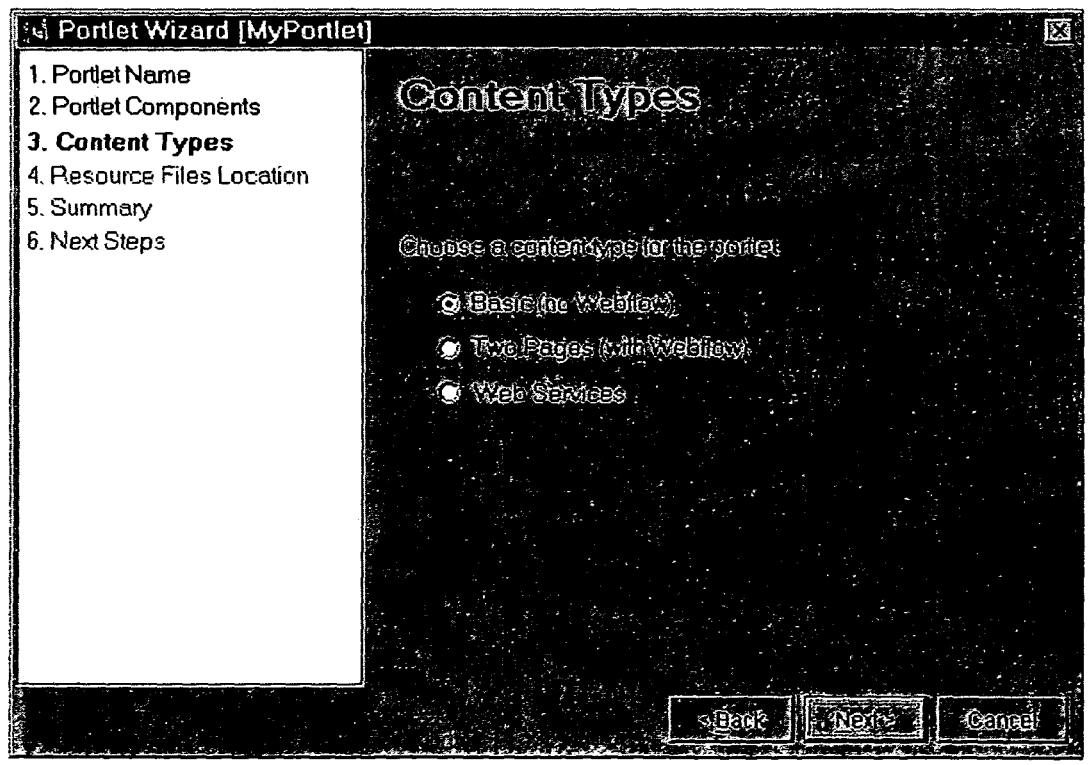

In step 430, wizard 125 displays a portlet content types screen to the user, allowing the user to specify whether the portlet will be implemented as a basic portlet, webflow-enabled portlet, or web service-enabled portlet. FIG. 7D illustrates a sample screen shot of a portlet content types screen. Basic portlets provide content, but do not implement logic to switch to alternate page views and do not provide web service content. In one embodiment, the content of basic portlets is static.

In contrast, webflow-enabled portlets can implement logic to switch to alternate page views, but do not provide web service content. For webflow-enabled portlets, separate content files are linked to each other and a webflow file is generated which describes the logic linking the pages together. In one embodiment, webflow-enabled portlets created by wizard 125 permit portlets to switch between exactly two page views.

Web service-enabled portlets can display web service content. In various embodiments, such portlets can permit clients to input data to be sent to web services as operations. If the user selects web service content, then the method proceeds to step 435 where the steps of FIG. 5 can be performed. Otherwise, the method proceeds to step 440.

Figure 7E:
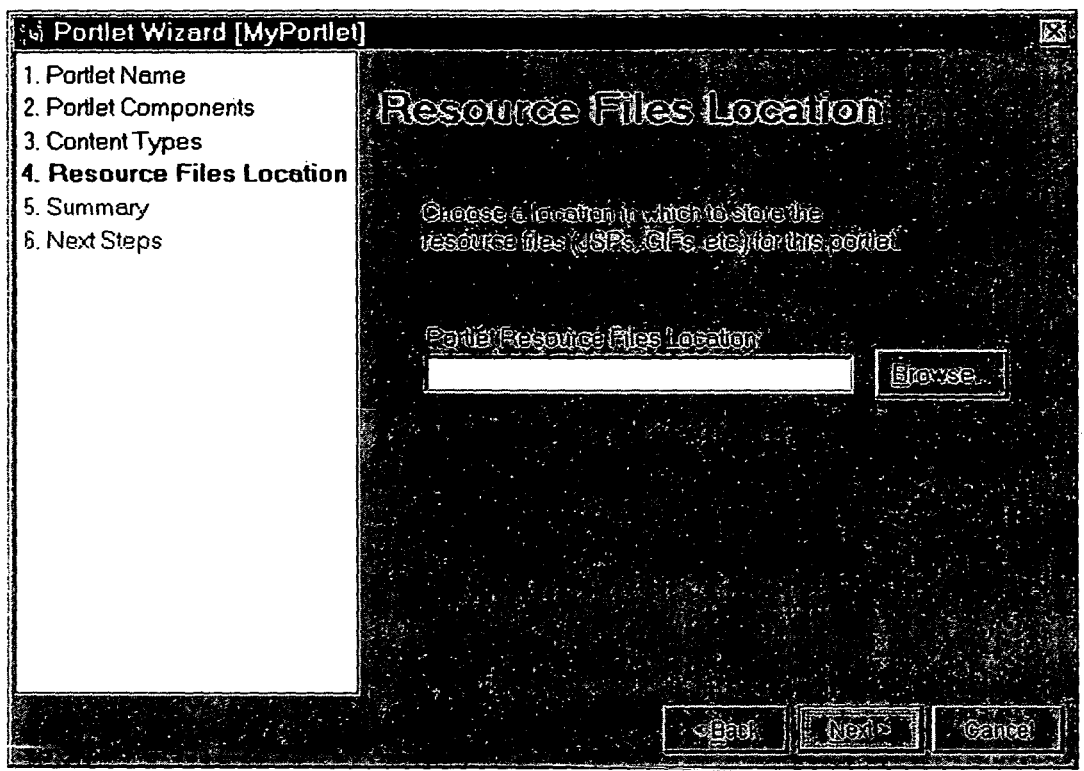

In step 440, wizard 125 displays a resource files location screen, allowing the user to specify where generated portlet files can be stored, such as a path on the user's local computer which is running control center 120. FIG. 7E illustrates a sample screen shot of a resource files location screen. The user can accept a default path, enter a path, or browse for a path. In one embodiment, wizard 125 provides a default path based on an educated guess of the root directory for application 135.

Figure 7F:
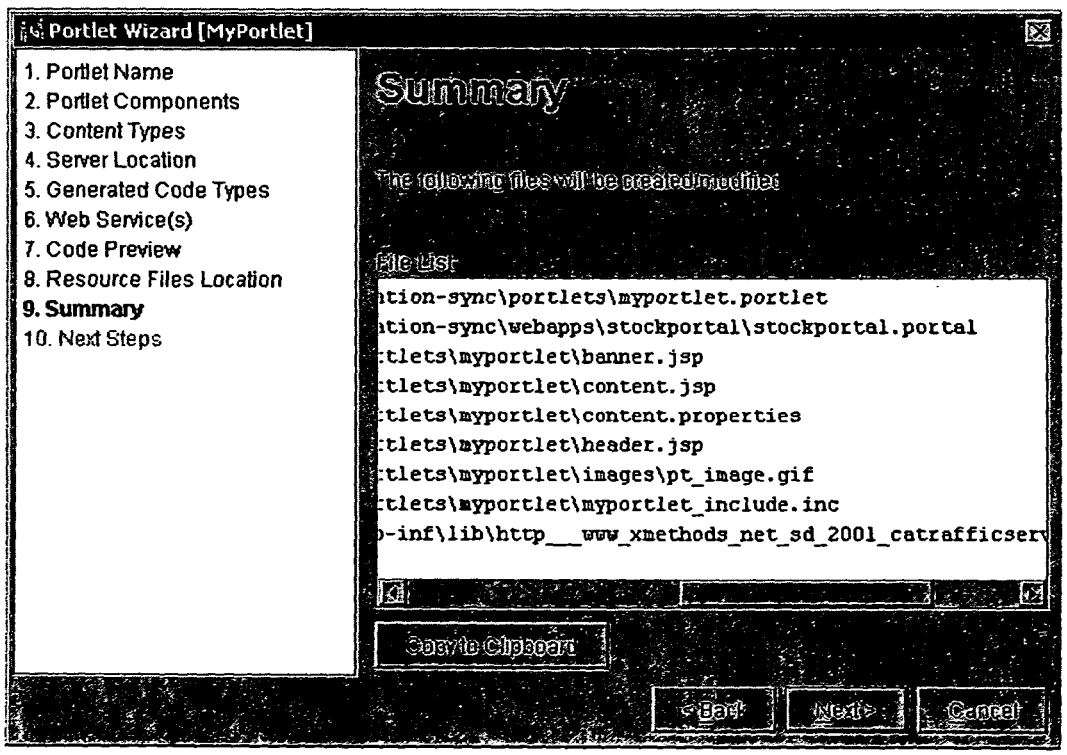

In step 445, wizard 125 displays a summary screen, allowing the user to view a list of portlet resource files (including their locations) to be generated in response to the data provided to wizard 125 in the preceding steps. In various embodiments, the list can be copied to a "clipboard" and/or printed. FIG. 7F illustrates a sample screen shot of a summary screen.

When the user clicks the "NEXT" button on the Summary screen, wizard 125 closes and files for the new portlet can be created and/or modified (step 450). In one embodiment, template JSPs and a template portlet definition are modified with configuration information supplied to wizard 125 by the user. In other embodiments, the steps of FIG. 4 can be performed to generate and/or modify the files for the new portlet. Appropriate client-side files for the portlet are generated and/or modified and stored in the location specified in step 440. A portlet definition which can contain XML based meta-data can be generated in accordance with user supplied configuration information. The portlet definition can specify the various resource files for the new portlet, including, for example: titlebar.jsp, banner.jsp, header.jsp, altheader.jsp, content.jsp, content2.jsp (if, for example, the two page with webflow option was previously selected); footer.jsp; altfooter.jsp; and help.jsp. Other resource files including images and webflow files can also be generated and/or modified in this step. In one embodiment, an XML definition of the portal containing the generated portlet is modified to reflect the new portlet. The method then proceeds to step 455.

Figure 7G:
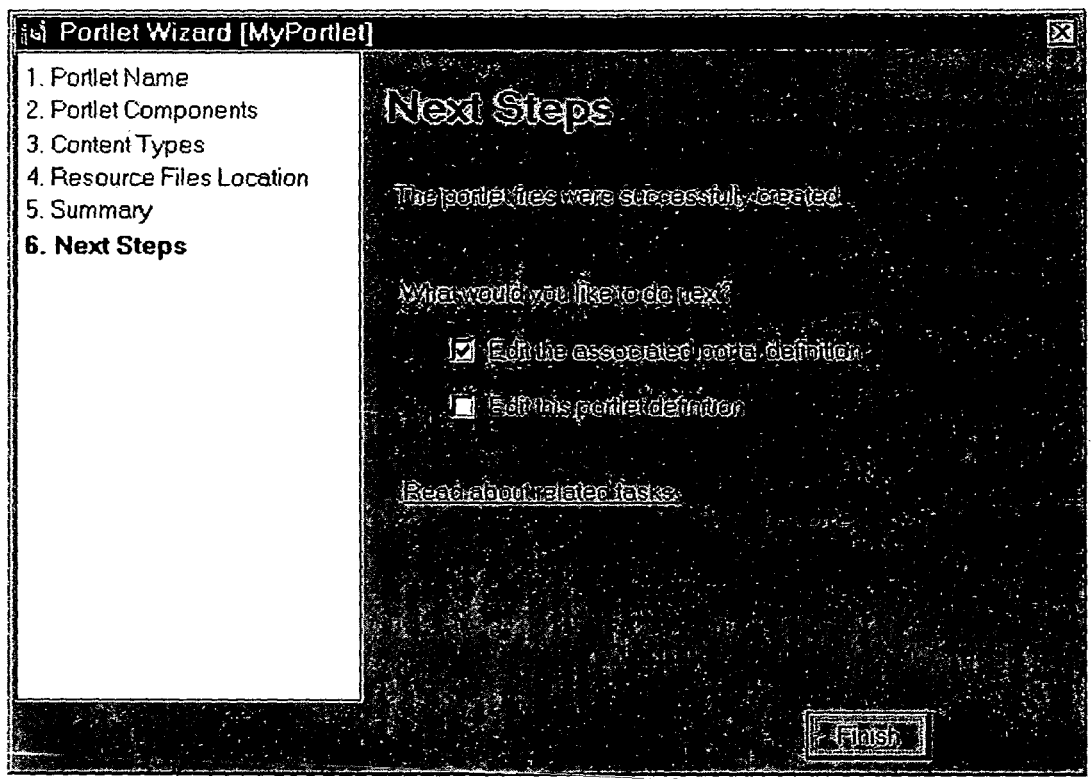

In step 455, a next steps screen is displayed that confirms the successful creation of a portlet and provides the user with options for tasks they are likely to perform next. These can include, but are not limited to: editing the definition of the previously selected portal, editing the definition of the generated portlet, or reading documentation for related tasks. FIG. 7G illustrates a sample screen shot of a next steps screen.

If the user decides to edit the portlet definition, a portlet editor is launched (step 465), allowing an XML-based portlet definition to be edited. In one embodiment, portions of the portlet definition relating to web services are not edited with the portlet editor. If the user chooses to edit the portal definition, a portal editor is launched (step 470), allowing an XML-based portal definition to be edited. For example, the portal definition can be edited to identify which portlets are assigned to the portal page. In various embodiments, the portlet and/or portal editors can be swing-based editors, wherein the user edits the portal and portlet definitions (i.e. edit portal attributes) by interacting with dialog boxes. If the user chooses to read documentation for related tasks, portlet documentation is opened (step 460).

Figure 5:
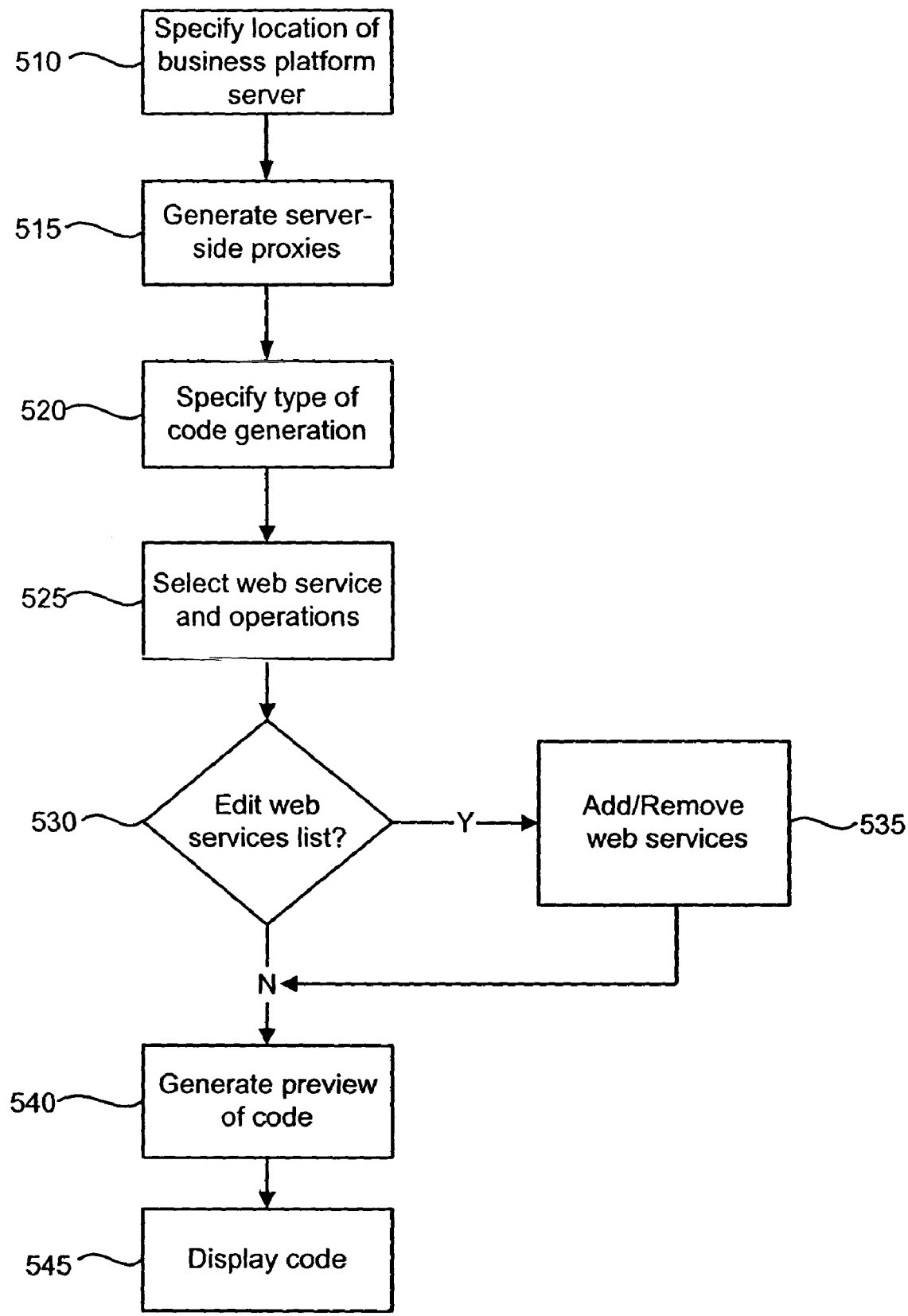
FIG. 5 is a flowchart of a method for implementing web services in a portlet in accordance with an embodiment of the present invention.
Figure 7H:
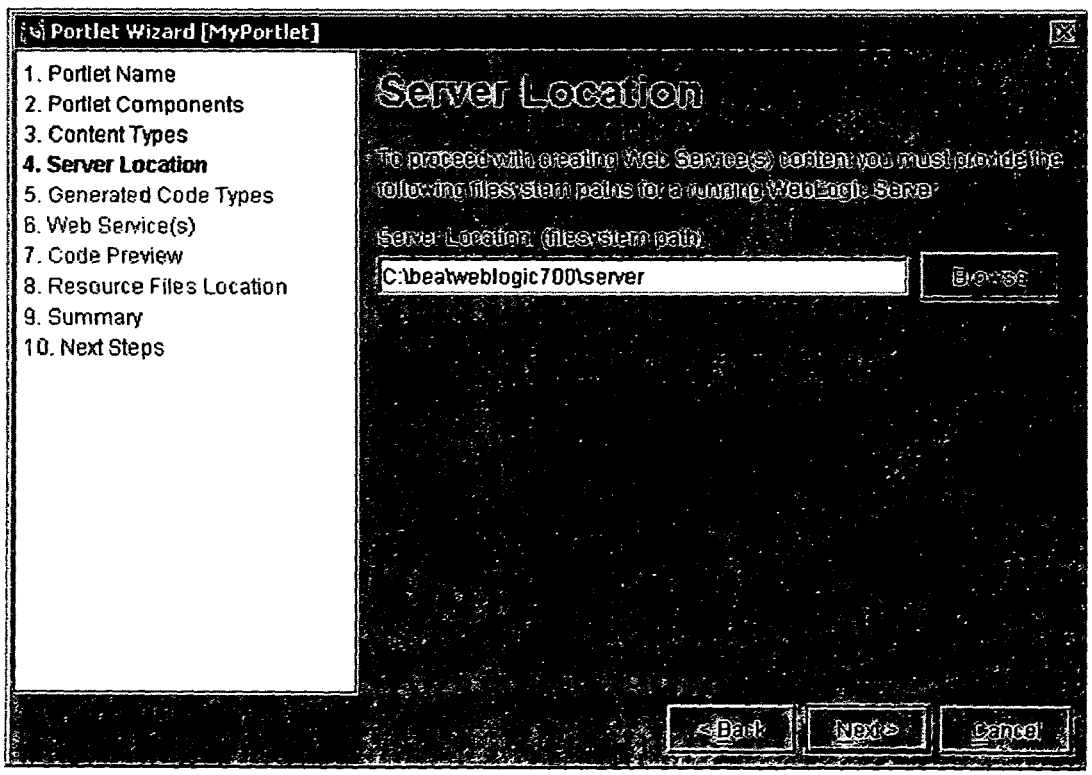

FIG. 5 is a flowchart of a method for implementing web services in a portlet in accordance with the present invention. In one embodiment, the method of FIG. 5 can be performed at step 435 of FIG. 4A. In step 510, a server location screen is displayed, allowing the user to identify a file system path for the location of business platform 130. This file system path can identify the location of a java archive file ("JAR") which can be used to generate server-side proxies, as further described herein. The file system path can be validated before the method proceeds to the next step. FIG. 7H illustrates a sample screen shot of a server location screen.

In step 515, server-side proxies can be generated to allow application 135 to communicate with web service 155. The proxies, such as proxy java code, can serialize and deserialize SOAP messages exchanged between a web service and the generated portlet. The proxies can be generated by proxy generation facilities of business platform 130 using a WSDL file (often referred to as "a WSDL") for web service 155. It is contemplated that various proxy generation methods can be used, as known and understood in the art. In one embodiment, a proxy generator such as Apache™ Axis, available from The Apache Software Foundation™ of Forest Hill, Md., can be used (Apache™ and The Apache Software Foundation™ are trademarks of The Apache Software Foundation™). In other embodiments, proxy generation can be performed by a proxy generator included within business platform 130. In an alternate embodiment, proxy generation step 515 can be skipped in favor of allowing application 135 to communicate with web service 155 using XML and XSLT transforms.

Figure 7I:
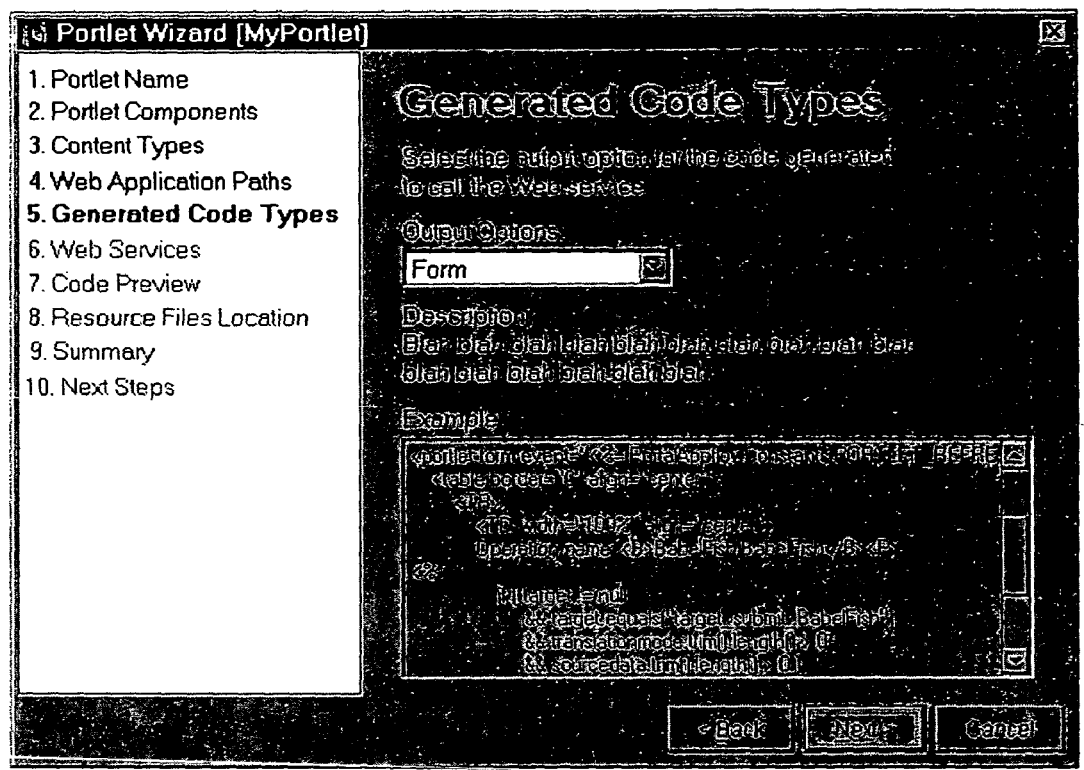

In step 520, a generated code types screen is displayed which allows the user to select from several methods of generating portlet JSP files. In various embodiments, form-based generation, web service all-based generation, and web service interface methods are available. FIG. 7I illustrates a sample screen shot of a generated code types screen.

Form-based generation creates portlet JSPs from portlet JSP templates (or "forms"). The resulting JSPs provide a portlet capable of calling web service operations based on parameters entered into wizard 120. If form-based generation is selected, wizard 125 can display a description and example of the output of form generation. A portlet having a form field for the user to pass data to a web service can be created.

Web service call-based generation creates portlet JSPs from portlet JSP templates. However, the resulting JSPs provide a portlet capable of calling web service operations based on parameters inserted into the JSP code by a user at a later time. For example, JSPs can be created with parameters having "_REPLACE_ME_" dummy values that a user subsequently replaces with actual values. In various embodiments, the replacement values of these parameters can also be retrieved from a client request, session, and/or client profile. If web service call generation is selected, wizard 125 can display a description and example of the output of the web service call generation below a drop-down menu.

Web service interface-based generation creates portlet JSPs which implement any number of web services with any number of web service operations. In various embodiments, JSPs created by this method can be further modified by developers. For example, a developer may want to chain two web services by passing the output of a first service to a second service. Using interface-based generation, the developer can modify the necessary JSPs to establish the chain.

Figure 7J:
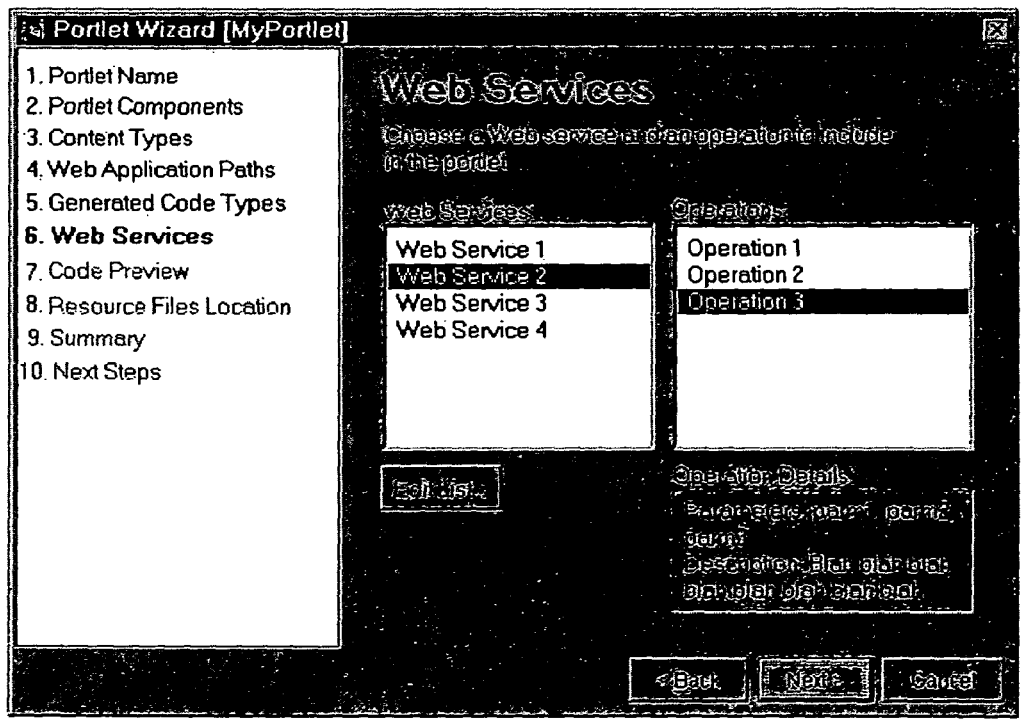

In step 525, a web services selection screen is displayed which allows the user to select available web services and operations for use in the generated portlet. In certain embodiments, if form-based generation or call-based generation was selected in step 520, only one web service and one operation may be selected. Alternatively, if interface-based generation was selected, then the user can select multiple web services, and need not select any operations (all operations for the Web services can be automatically included). In one embodiment, the lists of web services and operations shown by wizard 125 can be created from a directory of WSDL files. FIG. 7J illustrates a sample screen shot of a web services selection screen.

Figure 7K:
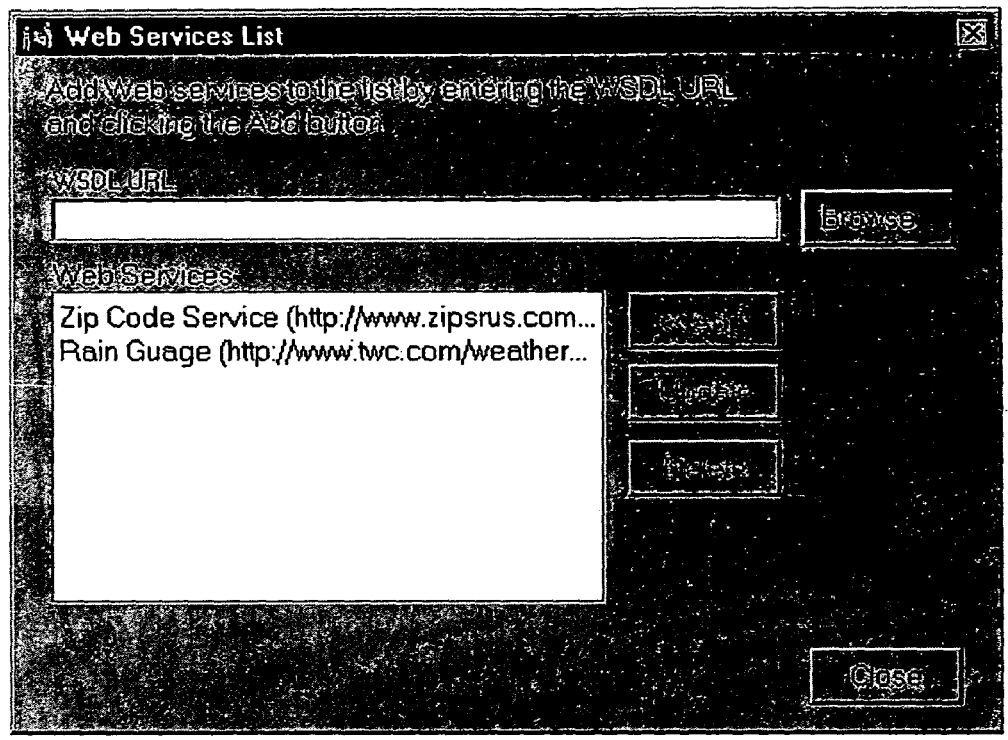

If a user desires to edit the list of web services (step 530), an add/remove web services screen can be displayed where the user can add or delete web services. FIG. 7K illustrates a sample screen shot of a web services selection screen. In various embodiments, the user can locate WSDL files by entering a WSDL URL, browse for WSDL files in a file system, and/or access a UDDI directory to retrieve a list of web services. The WSDL file for existing web services can also be updated. When a user attempts to add a web service, the corresponding WSDL file can be validated to determine whether proxy code can be generated based on the WSDL information. In yet another embodiment, the WSDL for added web services can be stored locally at control center 120, thus allowing the control center 120 to configure portlets without retrieving and/or validating a WSDL file multiple times.

Figure 7L:
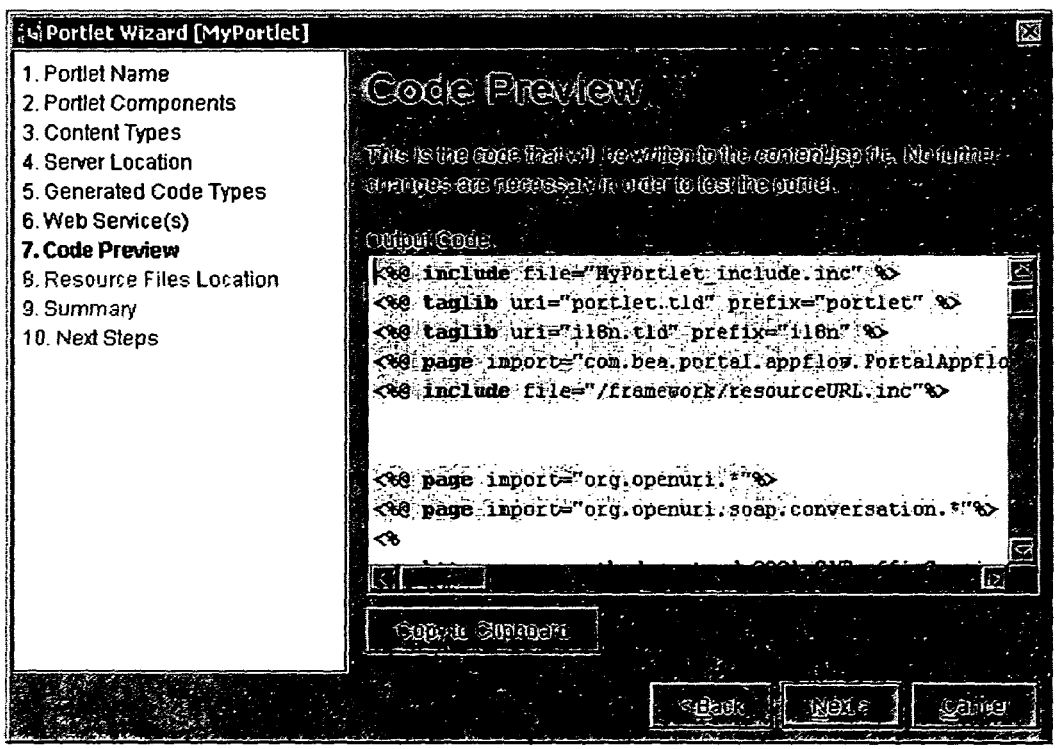

A preview of code to implement the portlet can be generated (step 540) and displayed to the user with a code preview screen (step 545). In one embodiment, the user can edit the previewed code and substitute actual values for any variables shown in the code. Additionally and/or alternatively, the user can perform full text editing of the previewed code, employ code completion methods as known in the art, and view the code in a syntax-colored format. In various embodiments, the code displayed in step 545 can, but need not, be validated. FIG. 7L illustrates a sample code preview screen.

Figure 6:
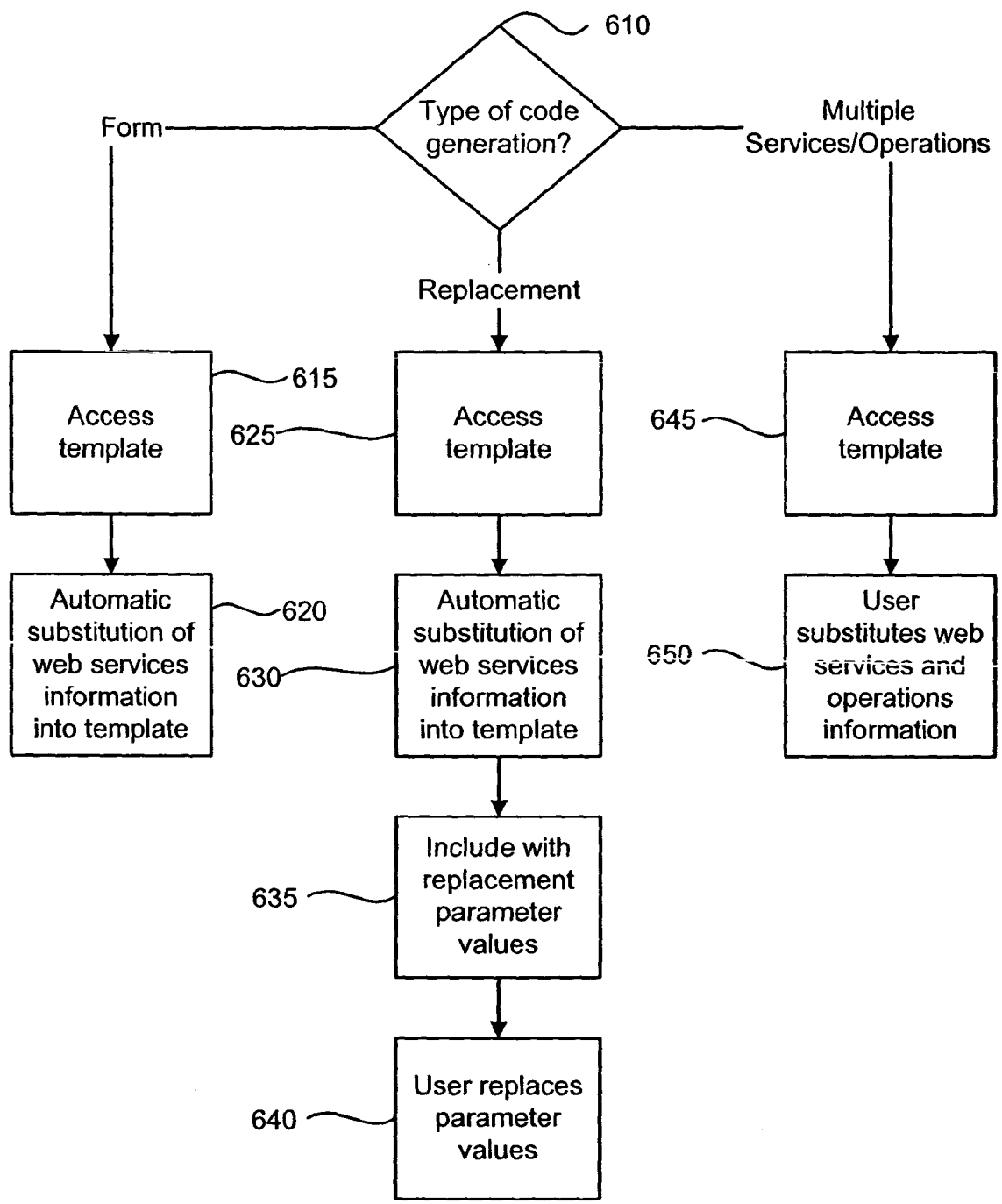
FIG. 6 is a flowchart of a method for automatically generating code for implementing a portlet in accordance with an embodiment of the present invention.

FIG. 6 is a flowchart of a method for automatically generating code for implementing a portlet in accordance with the present invention. In various embodiments, the method of FIG. 6 can be performed at step 450 of FIG. 4B. In one embodiment, the type of code generation previously selected at step 520 can be determined at step 610. If form-based generation is selected, the method proceeds to step 615 where a portlet template is accessed. The template can be modified in accordance with the web services information previously determined by wizard 125 (step 620). A portlet generated using form-based generation can provide a form entry field for the user to enter simple variable types in accordance with the specified parameters of a web service which can then be passed to the service. FIGS. 8A, 8B, and 8C illustrate sample portlet code generated in accordance with form-based code generation of the present invention.

If web service call-based generation is selected, the method proceeds to step 625 where a portlet template is accessed (step 625) and modified in accordance with the web services information previously determined by wizard 125 (step 630). In step 635, dummy values are inserted for parameters to be passed during web service operations. These parameters can later be replaced by the user with actual values if desired (step 640). FIG. 9 illustrates sample portlet code generated in accordance with web service call-based code generation of the present invention.

If web service interface-based generation is selected, the method proceeds to step 645. A portlet template can be accessed (step 645) and modified by the user to implement any number of web services with any number of web service operations (step 650). FIG. 10 illustrates sample portlet code generated in accordance with web service interface-based code generation of the present invention.

Portal Generation

Figure 11:
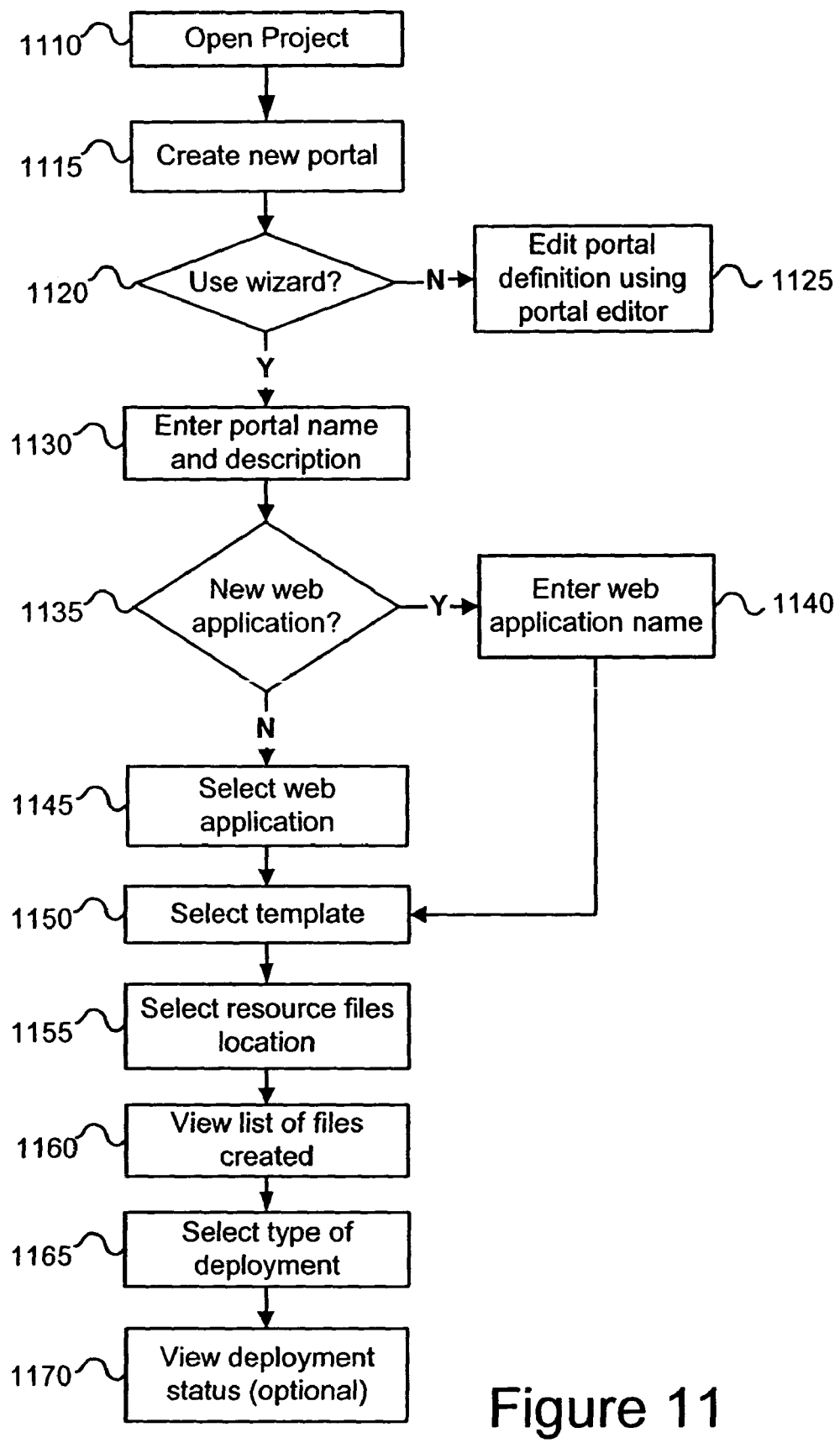
FIG. 11 illustrates a flow chart of a method using a wizard-style interface to facilitate the automatic generation of portals in accordance with an embodiment of the present invention.
Figure 12A:
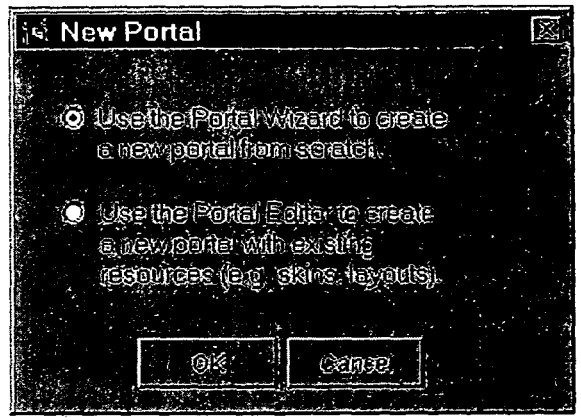
FIGS. 12A-H illustrate exemplary screen shots of a user interface for generating a portal in accordance with an embodiment of the present invention.

FIG. 11 illustrates a method of user interaction with a wizard-style interface that facilitates the automatic generation of portals in accordance with one embodiment of the present invention. In step 1110, a user (such as a business platform administrator) opens an existing enterprise application in control center 120. In step 1115, the user selects a new portal web application option from, for example, a menu selection in the control center. In step 1120, a new portal dialog screen allows the user to select whether or not the new portal should be created using a wizard-style interface. If the wizard-style interface option is not selected, the method proceeds to step 1125 where a dialog-based portal editor is opened for further interaction by the user. Using the dialog-based editor, the user can create a new portal by specifying existing J2EE resources. If the wizard-style interface is selected, wizard 125 is launched and the method proceeds to step 1130. FIG. 12A illustrates a sample screen shot of a new portal dialog screen. In the exemplary screen shot of FIG. 12A, the wizard-style interface option is selected by default.

Figure 12B:
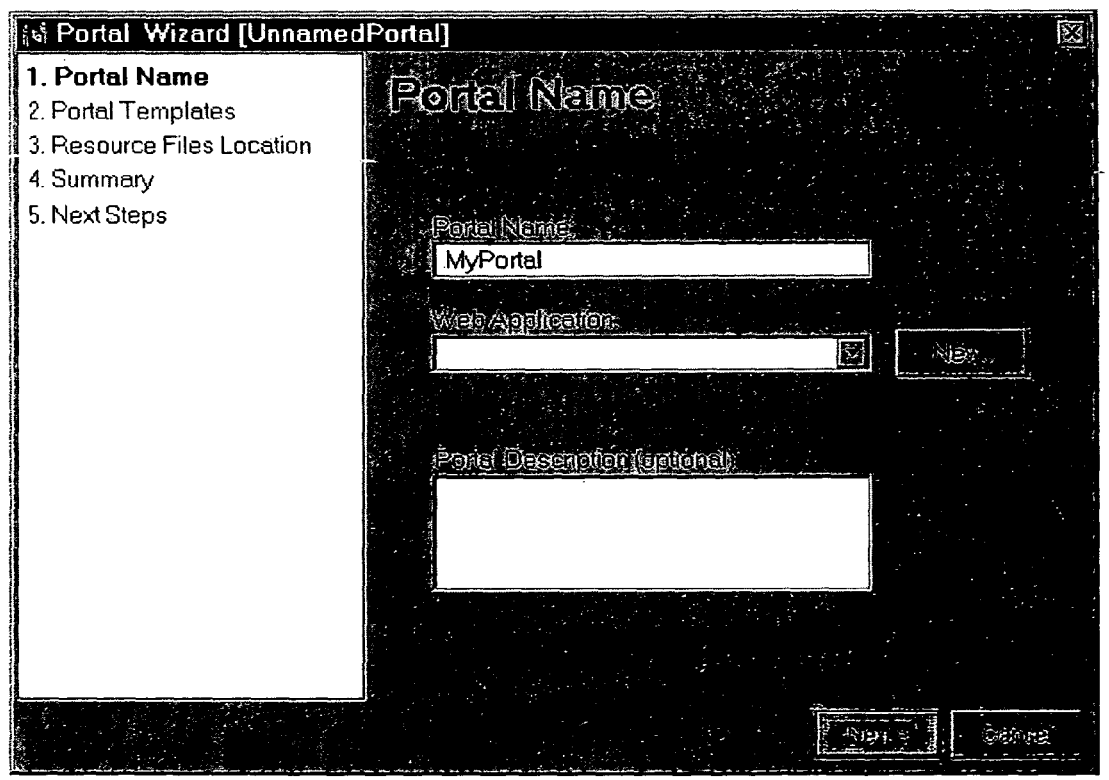

In step 1130, wizard 125 displays a portal name screen to the user. FIG. 12B illustrates an exemplary screen shot of a portal name screen. The user can enter a name and description for the portal to be created by wizard 125. The portal name screen in FIG. 12B includes fields for portal name, web application, and portal description (optional).

Figure 12C:
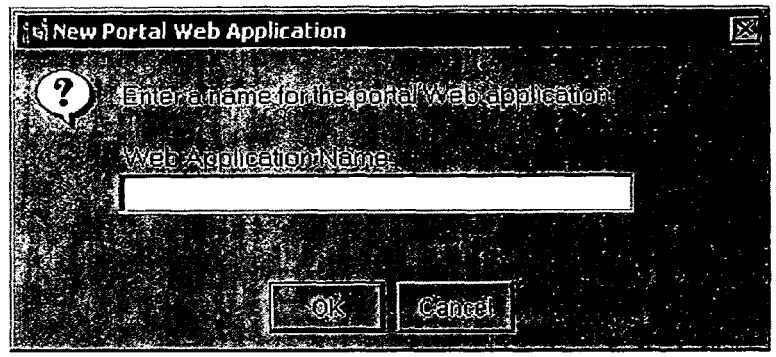

In step 1135, the user decides whether or not to create a new web application. A "NEW" button is provided within the portal name screen of FIG. 12B for the user to select if the user wishes to create a new web application to associate with the portal. If the user selects the "NEW" button to create a new portal web application, the method moves to step 1140 where the user can enter a name for the new portal web application. FIG. 12C illustrates an exemplary screen shot of a new portal web application screen. After entering a name for the new portal web application, the method moves to step 1150.

If the user does not select the "NEW" button to create a new web application, the method moves to step 1145 where a pre-existing web application can be selected. The web application field of the portal name screen in FIG. 12B allows the user to select a pre-existing web application with which to associate the portal. A browse feature or drop-down menu can be provided to allow the user to browse local directories for web applications. A list of web applications can be found, for example, locally in the current control center project directory.

Figure 12D:
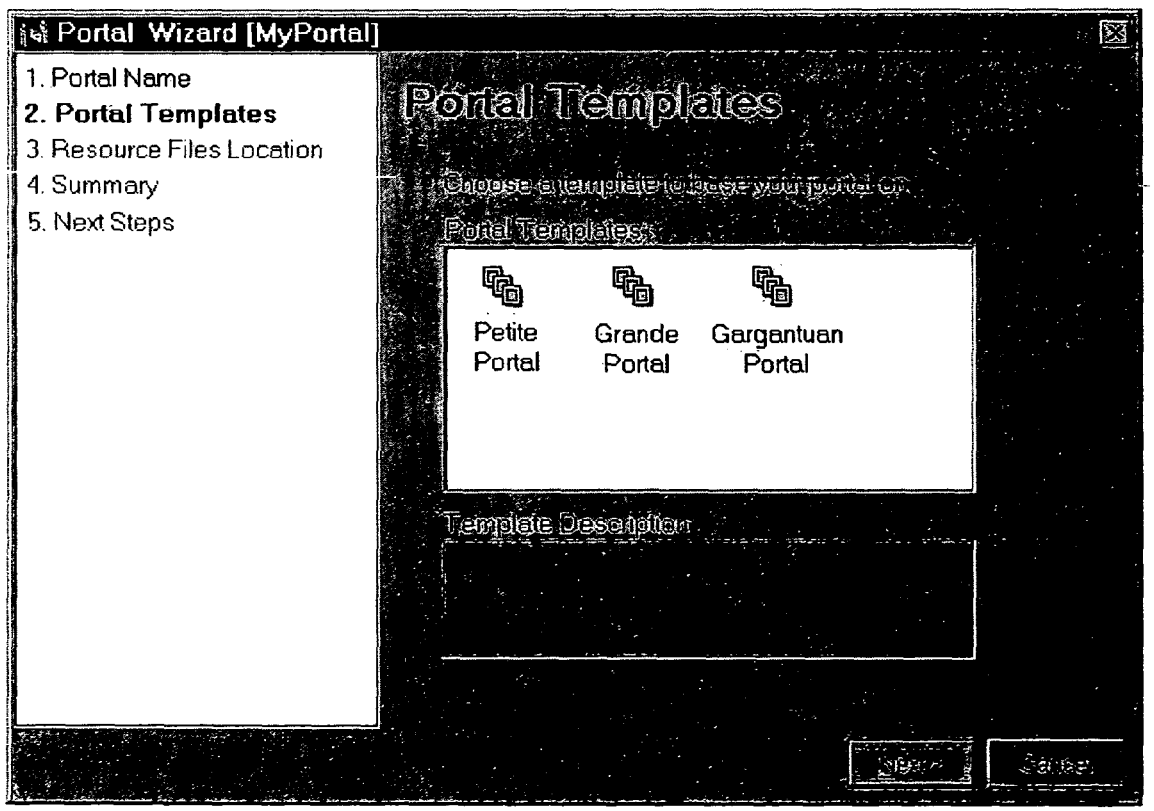

After entering a new portal web application name in step 1140 or selecting a web application in step 1145, the method moves to step 1150 where wizard 125 displays a portal template screen. The portal template screen allows the user to select a portal template on which to base the portal. FIG. 12D illustrates an exemplary screen shot of a portal template screen. A list of templates with icons and descriptions for the templates can be presented. While three portal templates are shown in FIG. 12D, any number of templates can be presented to the user. Additionally, multiple types of portal templates can be presented, including for example, a template for a single portal with one portlet or a template for a portal with multiple portlets. Users can also create their own templates (outside of wizard 125) which can then be presented in the portal template selection screen. The portal wizard can search known directories for portal templates and present these to the user in the portal template selection screen. In one embodiment, the templates are stored in a sub-directory of the control center installation directory or within a sub-directory of a home directory of business platform 130.

A template can be a JAR file or a set of directories that contain control center portal information and J2EE portal information. A template can include a portal definition, portlet definitions, an Ant (a Java-based build tool available from The Apache Software Foundation™ of Forest Hill, Md.) build file or other build file, JSP's, images such as GIF files, and other files for portal generation. The following contents can appear inside an exemplary template JAR file (e.g. "myPortalTemplate.jar) or set of directories: a template.xml file; a template.properties file; a templateIcon.gif file; any additional resources needed by the template; and directories containing any resources needed by the template including JSPs, images, libs, and other directories.

Figure 12E:
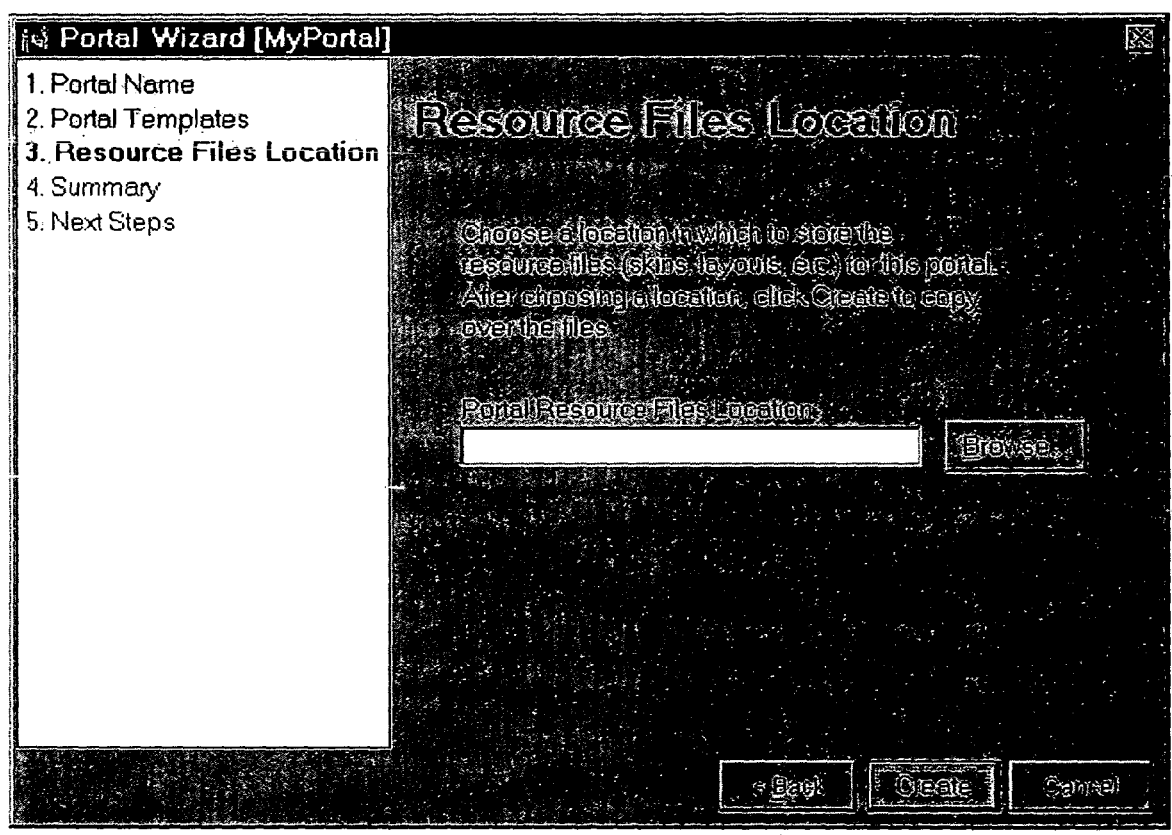

After selecting a portal template, the method moves to step 1155 where wizard 125 displays a resource files location screen to the user, allowing the user to select a location in which to store resource files. FIG. 12E illustrates an exemplary screen shot of a resource files location screen. In this step, the user selects a directory or location in which to place the J2EE resource files. In one embodiment, the portal resource files location defaults to a file system path corresponding to the directory for the enterprise application from the control center project file and the web application selected in step 1145 or 1140. If no default file system path is present, or if the user wishes to place the resource files into an alternate location, the user can enter a file system path or select "BROWSE" to select a file system path. The user can select to have the selected web application exist in a different location from the enterprise application by selecting a path different from that of the enterprise application.

After selecting a resource files location, the user selects "CREATE" to begin generation of the resource files. In one embodiment, the resource files are generated using Ant. Other build tools can also be used, as known and understood in the art.

Figure 12F:
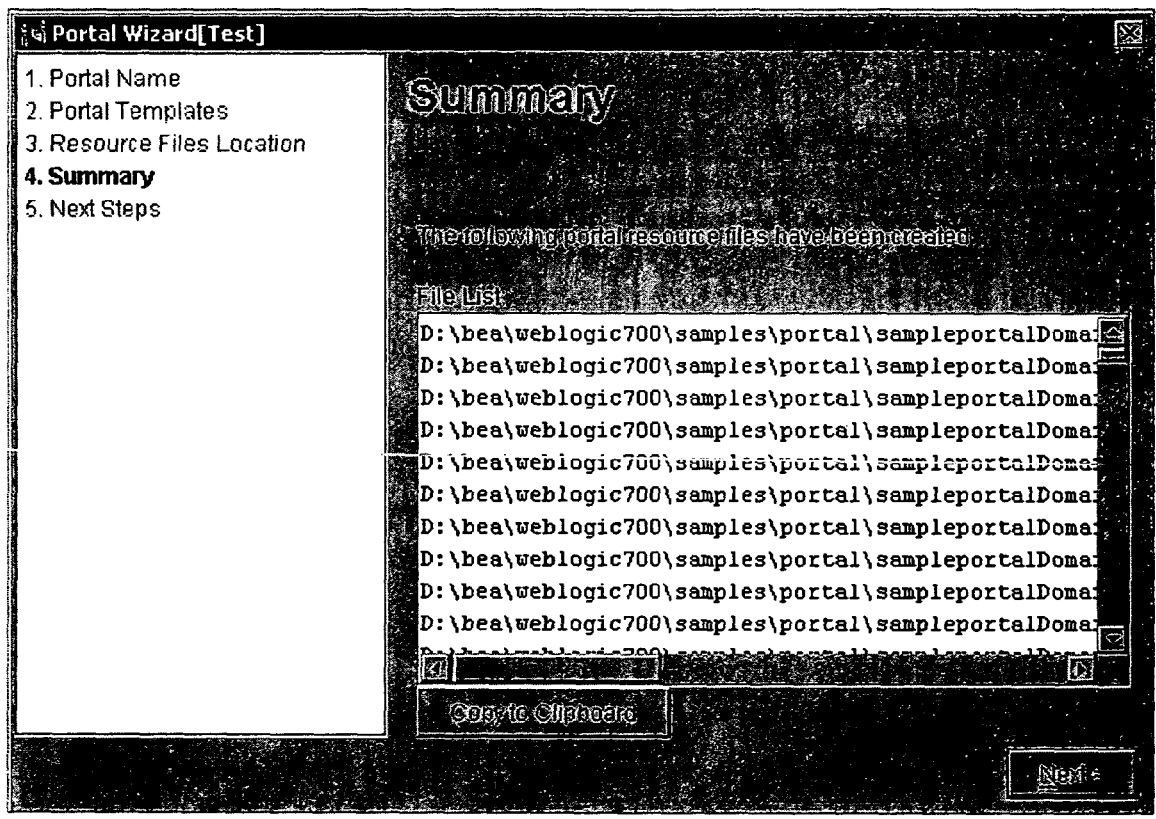
Figure 12G:
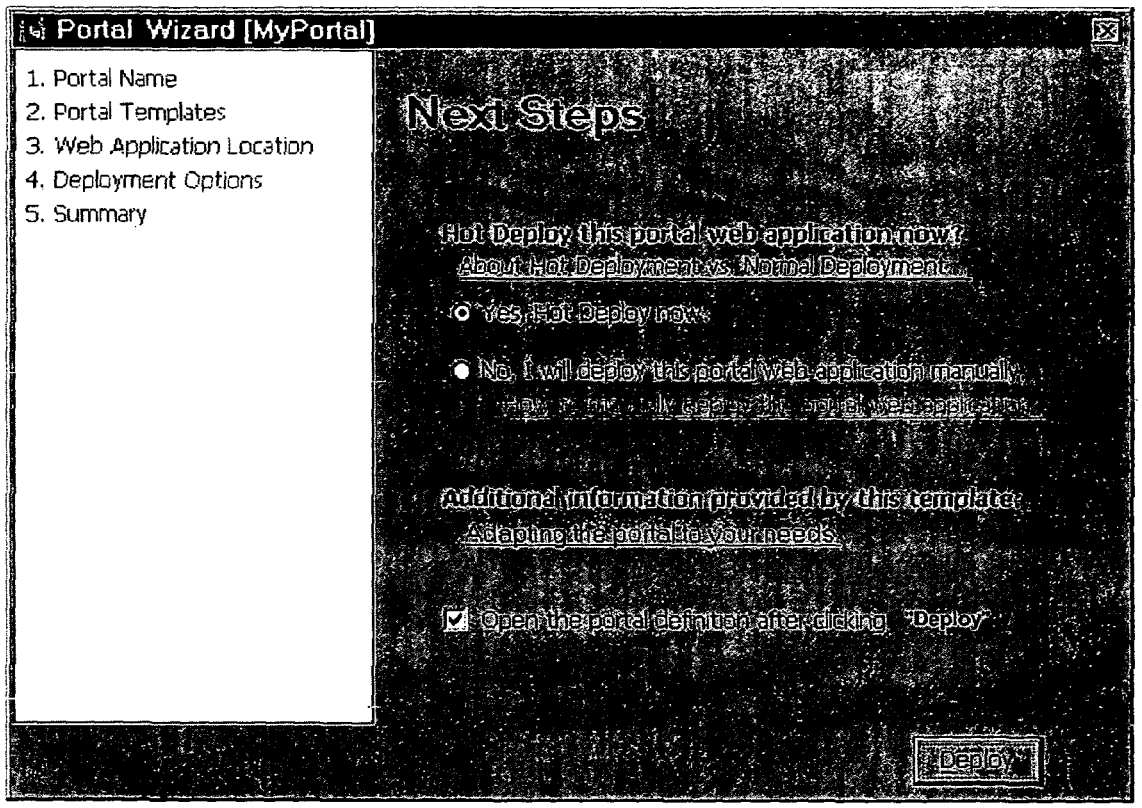

In step 1160, wizard 125 displays a summary screen, allowing the user to view a list of portal resource files (including their locations) generated in response to the information provided to wizard 125 in the preceding steps. In one embodiment, the list can be copied to a "clipboard." FIG. 12F illustrates an exemplary screen shot of a summary screen.

In step 1165, wizard 125 displays a next steps screen, allowing the user to select deployment options for the web application created by the wizard in the preceding steps. The user can select between a hot deploy option and a normal deploy option. Additionally, hyperlinks are provided to documentation regarding hot deployment and normal deployment, as well as to instructions on how to manually deploy the portal web application created in the preceding steps, should the user choose the normal deployment option. A link can be provided to information regarding adaptation of the portal to a user's needs. The user is also presented with the option of viewing the portal definition after selecting "DEPLOY."

During deployment, configuration information required for proper use of the web application is supplied to the application server. If normal deployment is selected by a user, the user manual deploys the web application. The user can follow instructions for manual deployment by clicking the provided hyperlink to view the instructions. In a manual deployment, the server is stopped in order to provide configuration information for the web application to the server. After the configuration information has been provided, the server can be restarted. If hot deployment is selected, the web application generated by wizard 125 is deployed while the server is running and without manual deployment by the user. If not already connected to a server, wizard 125 can prompt the user to connect to a server. A default server can be determined and presented to the user for selection using the server specified in the control center project.

Figure 12H:
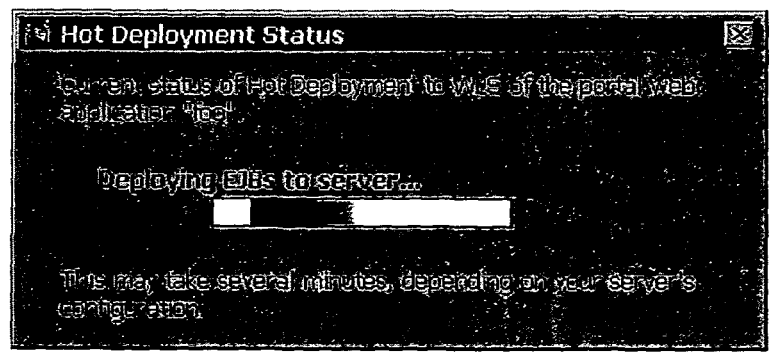

In step 1170, wizard 125 displays a hot deployment status screen if the user selected the hot deployment option in step 1165. The hot deployment status screen can display the status of the deployment. FIG. 12H illustrates an exemplary screen shot of a hot deployment status screen.

Figure 13:
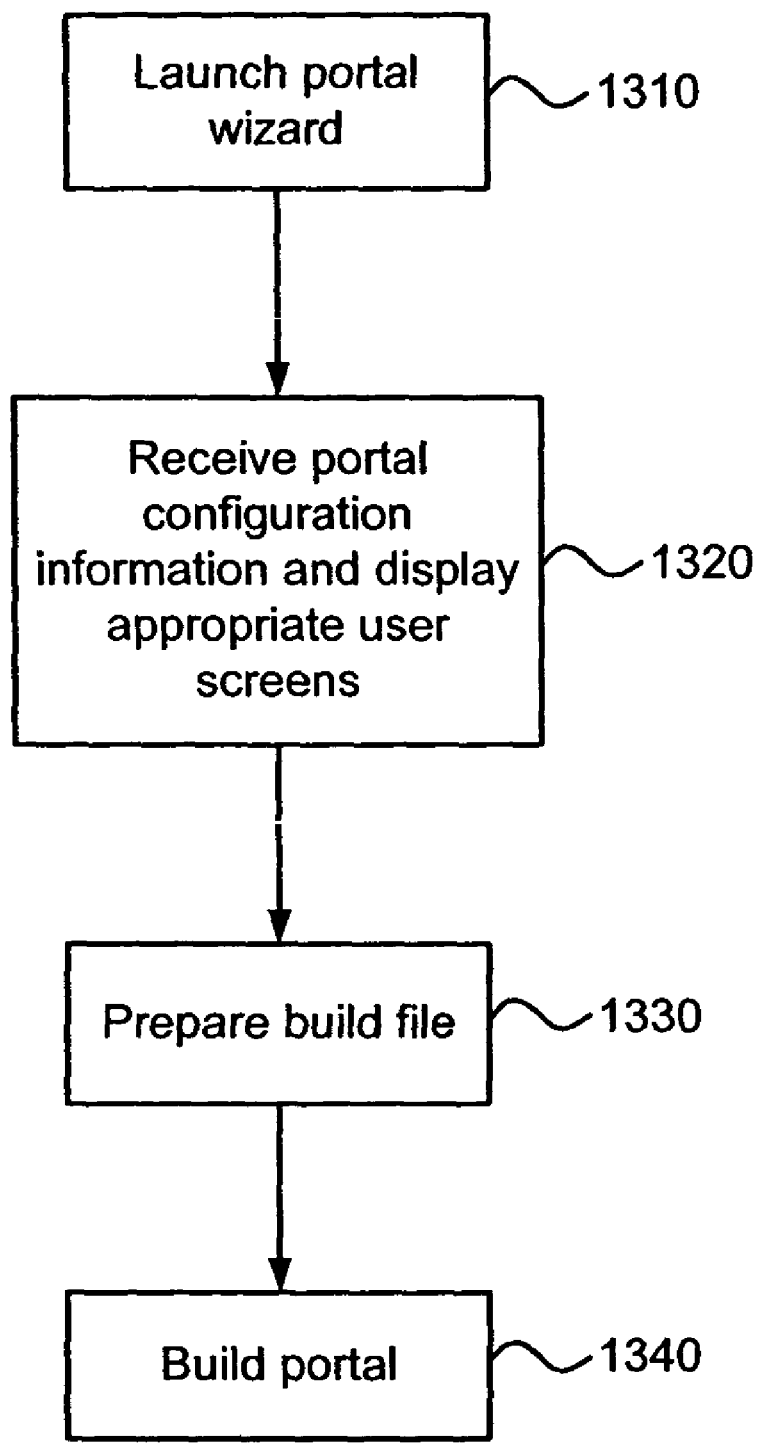
FIG. 13 illustrates a flowchart of a method in accordance with one embodiment of the present invention of automatically generating a portal.

FIG. 13 illustrates a flowchart of a method in accordance with one embodiment of the present invention of automatically generating a portal. In step 1310, a portal wizard is launched. The portal wizard can be launched in response to a user selection as shown in step 1120 of FIG. 11 and the screen shot of FIG. 12A.

In step 1320, appropriate user screens are displayed and portal configuration information is received from user inputs. In one embodiment, the appropriate user screens are displayed and the portal configuration information is received as illustrated in steps 1130 to 1155 of FIG. 11 and the screen shots of FIGS. 12B to 12E.

In step 1330, a build file is prepared. In one embodiment, the build file can include XML. In another embodiment, the build file is a template Ant XML build file modified according to configuration information input by the user into the wizard. As previously discussed, each template includes an Ant XML build file or other build file. The build file can contain configuration information as XML based meta-data that a builder program can access in order to copy, modify, create, and/or move files in order to generate a portal. The build file (e.g. template.xml) can contain information that specifies: what files to copy in the build process; where the J2EE resource files are to be placed; where the set of control center files is to be placed; a template version number and type (e.g. domain template, portal template, etc.); template name; description (for display in wizard 125); the replacement, filtration, and/or substitution of certain strings, variables, or information within certain template files with other strings, variables, or information (e.g., substitute the user entered display name for the stock display name in "web.xml"); optional summary text to display at the end of the wizard; as well as other instructions or information to be used in the portal generation. The information entered by the user and gathered by the Wizard can be used to modify the Ant XML build file included within a template so that Ant can build and compile the appropriate project.

In step 1340, a portal is built. In one embodiment, the portal is built by copying and configuring files from a template with information input into the wizard by the user. As part of the build copying and/or modification can be carried out in accordance with the information included within the build file. For example, the modified Ant build file can specify that the default portal name be replaced with the name entered by the user in step 1130 during the generation process.

FIGS. 14A and 14B illustrate sample code for an XML portal definition generated as part of the creation of the portal resource files. FIG. 15 illustrates sample code for an XML portlet definition generated as part of the creation of the portal resource files. In one embodiment, the portlet definition is identical to the XML portlet definition included in the template.

The foregoing description of preferred embodiments of the present invention has been provided for the purposes of illustration and description. It is not intended to be exhaustive or to limit the invention to the precise forms disclosed. Many modifications and variations will be apparent to one of ordinary skill in the relevant arts. For example, steps performed in the embodiments of the invention disclosed can be performed in alternate orders, certain steps can be omitted, and additional steps can be added. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the claims and their equivalence.

One embodiment may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

One embodiment includes a computer program product which is a storage medium (media) having instructions stored thereon/in which can be used to program a computer to perform any of the features presented herein. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, execution environments/containers, and user applications.

What is claimed is:

1. A method for automatically generating a web service display, comprising:
    providing a wizard that uses either a form-based interaction with a portlet to request a web service where configuration data is entered into the wizard to request the web service, or a web services selection screen that allows for selection of the web service, wherein the configuration data includes information that allows access to the web service, and wherein the web service is implemented as a software component to provide services through the portlet;
    wherein at least one screen is presented to a user requesting selection of at least one of the following: a name for said portlet, a portal with which to associate said portlet, a description of said portlet, a portlet component to include in said portlet, a content type for said portlet, and a location in which to store resource files of said portlet;
    wherein at least one of said name for said portlet, said portal with which to associate said portlet, said description of said portlet, said portlet component to include in said portlet, said content type for said portlet, and said location in which to store resource files of said portlet is received;
    requesting the web service through the wizard;
    automatically generating a proxy that creates a communication code to access said web service based upon said configuration data when the request for the web service is made, wherein the proxy is generated as part of the portlet;
    transmitting the communication code to the web service by the proxy, wherein the step of transmitting the communication code includes
        converting communication code to XML format,
        communicating said converted communication code to said web service,
        receiving XML web service response data from said web service,
        converting said response data from XML format to a format used at the portlet, and
        generating a display code for said content of said web service and displaying the code within the portlet;
    accessing said web service based on the display code received at the portlet.

2. The method of claim 1, further comprising:
acquiring a WSDL file for said web service, wherein said proxies are generated using said WSDL file.

3. The method of claim 1, wherein said receiving step comprises:
providing a wizard user interface; and
receiving said configuration data from user input to said wizard user interface.

4. The method of claim 1, wherein:
said web service display permits client interaction with said web service.

5. The method of claim 1, wherein:
said web service display is a portlet.

6. The method of claim 1, wherein a summary screen is presented to a user, said summary screen including a list of files created and modified during said generation of said portlet.

7. A computer readable storage medium storing one or more sequences of instructions for automatically generating a web service display, which instructions, when executed by one or more processors, cause the one or more processors to carry out the steps of:
providing a wizard that uses either a form-based interaction with a portlet to request a web service where configuration data is entered into the wizard to request the web service, or a web services selection screen that allows for selection of the web service, wherein the configuration data includes information that allows access to the web service, and wherein the web service is implemented as a software component to provide services through the portlet;
wherein at least one screen is presented to a user requesting selection of at least one of the following: a name for said portlet, a portal with which to associate said portlet, a description of said portlet, a portlet component to include in said portlet, a content type for said portlet, and a location in which to store resource files of said portlet;
wherein at least one of said name for said portlet, said portal with which to associate said portlet, said description of said portlet, said portlet component to include in said portlet, said content type for said portlet, and said location in which to store resource files of said portlet is received;
requesting the web service through the wizard;
automatically generating a proxy that creates a communication code to access said web service based upon said configuration data when the request for the web service is made, wherein the proxy is generated as part of the portlet;
transmitting the communication code to the web service by the proxy, wherein the step of transmitting the communication code includes
converting communication code to XML format,
communicating said converted communication code to said web service,
receiving XML web service response data from said web service,
converting said response data from XML format to a format used at the portlet, and
generating a display code for said content of said web service and displaying the code within the portlet;
accessing said web service based on the display code received at the portlet.

8. The computer readable storage medium of claim 7, further capable of performing the steps:
acquiring a WSDL file for said web service, wherein said proxies are generated using said WSDL file.

9. The computer readable storage medium of claim 7, wherein receiving configuration data for a web service comprises:
providing a wizard user interface; and
receiving said configuration data from user input to said wizard user interface.

10. The computer readable storage medium of claim 7, wherein:
said display of content of said web service permits client interaction with said web service.

11. The computer readable storage medium of claim 7, wherein:
said display of content of said web service is a portlet.

12. A computer readable storage medium containing computer software, comprising:
means for providing a wizard that uses either a form-based interaction with a portlet to request a web service where configuration data is entered into the wizard to request the web service, or a web services selection screen that allows for selection of the web service, wherein the configuration data includes information that allows access to the web service, and wherein the web service is implemented as a software component to provide services through the portlet;
wherein at least one screen is presented to a user requesting selection of at least one of the following: a name for said portlet, a portal with which to associate said portlet, a description of said portlet, a portlet component to include in said portlet, a content type for said portlet, and a location in which to store resource files of said portlet;
wherein at least one of said name for said portlet, said portal with which to associate said portlet, said description of said portlet, said portlet component to include in said portlet, said content type for said portlet, and said location in which to store resource files of said portlet is received;
means for requesting the web service through the wizard;
means for automatically generating a proxy that creates a communication code to access said web service based upon said configuration data when the request for the web service is made, wherein the proxy is generated as part of the portlet;
means for transmitting the communication code to the web service by the proxy, wherein the step of transmitting the communication code includes
converting communication code to XML format,
communicating said converted communication code to said web service,
receiving XML web service response data from said web service,
converting said response data from XML format to a format used at the portlet, and
generating a display code for said content of said web service and displaying the code within the portlet;
means for accessing said web service based on the display code received at the portlet.

13. A system for automatically generating a web service display, comprising:
a server, including one or more processors, which receives configuration data from a web service, wherein said web service is implemented as a software component to provide services through a portlet; and
one or more stored sequences of instructions which, when executed by the one or more processors, cause the processor to carry out the steps of:
providing a wizard that uses either a form-based interaction with a portlet to request a web service where configuration data is entered into the wizard to request the web service, or a web services selection screen that allows for selection of the web service, wherein the configuration data includes information that allows access to the web service, and wherein the web service is implemented as a software component to provide services through the portlet;

wherein at least one screen is presented to a user requesting selection of at least one of the following: a name for said portlet, a portal with which to associate said portlet, a description of said portlet, a portlet component to include in said portlet, a content type for said portlet, and a location in which to store resource files of said portlet;

wherein at least one of said name for said portlet, said portal with which to associate said portlet, said description of said portlet, said portlet component to include in said portlet, said content type for said portlet, and said location in which to store resource files of said portlet is received;

requesting the web service through the wizard;

automatically generating a proxy that creates a communication code to access said web service based upon said configuration data when the request for the web service is made, wherein the proxy is generated as part of the portlet;

transmitting the communication code to the web service by the proxy, wherein the step of transmitting the communication code includes converting communication code to XML format, communicating said converted communication code to said web service, receiving XML web service response data from said web service, converting said response data from XML format to a format used at the portlet, and generating a display code for said content of said web service and displaying the code within the portlet;

accessing said web service based on the display code received at the portlet.

14. The system of claim 13, further comprising:
acquiring a WSDL file for said web service, wherein said proxies are generated using said WSDL file.

15. The system of claim 13, wherein said receiving step comprises:
providing a wizard user interface; and
receiving said configuration data from user input to said wizard user interface.

16. The system of claim 13, wherein:
said web service display permits client interaction with said web service.

17. The system of claim 13, wherein:
said web service display is a portlet.

* * * * *

UNITED STATES PATENT AND TRADEMARK OFFICE
CERTIFICATE OF CORRECTION

PATENT NO. : 7,725,560 B2  
APPLICATION NO. : 10/377917  
DATED : May 25, 2010  
INVENTOR(S) : Christopher E. Bales et al.

Page 1 of 1

It is certified that error appears in the above-identified patent and that said Letters Patent is hereby corrected as shown below:

On Title page 3, Item (56), in column 1, under "Other Publications", line 16, delete "Intergrated" and insert -- Integrated --, therefor.

In column 1, line 25, delete "or but" and insert -- or records, but --, therefor.

In column 3, line 30, delete "XXML-" and insert -- XML- --, therefor.

In column 4, line 59, delete "shown)" and insert -- shown), --, therefor.

In column 5, line 10, delete "simple" and insert -- sample --, therefor.

In column 7, line 17, delete "all-" and insert -- call- --, therefor.

Signed and Sealed this  
Twelfth Day of July, 2011

David J. Kappos  
*Director of the United States Patent and Trademark Office*